United States Patent
Yoshida et al.

(10) Patent No.: US 11,581,566 B2
(45) Date of Patent: Feb. 14, 2023

(54) SECONDARY BATTERY AND METHOD FOR MANUFACTURING THE SAME

(71) Applicant: NEC Corporation, Tokyo (JP)

(72) Inventors: Noboru Yoshida, Tokyo (JP); Kazuhiko Inoue, Tokyo (JP)

(73) Assignee: NEC CORPORATION, Tokyo (JP)

( * ) Notice: Subject to any disclaimer, the term of this patent is extended or adjusted under 35 U.S.C. 154(b) by 197 days.

(21) Appl. No.: 16/489,002

(22) PCT Filed: Feb. 8, 2018

(86) PCT No.: PCT/JP2018/004369
§ 371 (c)(1),
(2) Date: Aug. 27, 2019

(87) PCT Pub. No.: WO2018/155207
PCT Pub. Date: Aug. 30, 2018

(65) Prior Publication Data
US 2020/0028199 A1    Jan. 23, 2020

(30) Foreign Application Priority Data

Feb. 27, 2017 (JP) .............................. JP2017-034668

(51) Int. Cl.
*H01M 4/02* (2006.01)
*H01M 50/183* (2021.01)
(Continued)

(52) U.S. Cl.
CPC ........... *H01M 10/049* (2013.01); *H01M 4/02* (2013.01); *H01M 10/0565* (2013.01);
(Continued)

(58) Field of Classification Search
CPC .......... H01M 4/02; H01M 4/12; H01M 10/04; H01M 10/052
See application file for complete search history.

(56) References Cited

U.S. PATENT DOCUMENTS

2008/0096108 A1\* 4/2008 Sumiyama .............. H01M 4/12
                                                                      429/206
2011/0183212 A1    7/2011 Takahashi et al.
(Continued)

FOREIGN PATENT DOCUMENTS

CN        1816922 A       8/2006
CN      101414676 A       4/2009
(Continued)

OTHER PUBLICATIONS

International Search Report of PCT/JP2018/004369 dated Mar. 20, 2018.
(Continued)

*Primary Examiner* — Kenneth J Douyette
(74) *Attorney, Agent, or Firm* — Sughrue Mion, PLLC

(57) ABSTRACT

One of the objects of the present invention is to suppress a short circuit due to metal deposition in an insulating layer in a secondary battery in which a positive electrode and a negative electrode are disposed to face each other via the insulating layer. The secondary battery comprises a battery element including at least one positive electrode 11 and at least one negative electrode 12, and a casing that seals the battery element together with an electrolyte. At least one of the positive electrode 11 and the negative electrode 12 comprises a current collector, an active material layer formed on at least one surface of the current collector, and an insulating layer 112 formed on the surface of the active material layer. The electrolyte comprises an electrolyte component and a crosslinked gelling agent. The gelling agent exists at least between the active material layer of the positive electrode 11 and the active material layer of the negative electrode 12, and the ratio Rg of the gelling agent to 100% by mass of the electrolyte component in between the active material layer of the positive electrode 11 and the (Continued)

active material layer of the negative electrode 12 is $0<Rg\leq5\%$ by mass.

15 Claims, 7 Drawing Sheets

(51) Int. Cl.
*H01M 10/04* (2006.01)
*H01M 10/0565* (2010.01)
*H01M 10/0567* (2010.01)
*H01M 10/0585* (2010.01)

(52) U.S. Cl.
CPC .......... *H01M 10/0567* (2013.01); *H01M 10/0585* (2013.01); *H01M 50/183* (2021.01)

(56) References Cited

U.S. PATENT DOCUMENTS

| | | | |
|---|---|---|---|
| 2011/0274982 A1 | 11/2011 | Kaneko et al. | |
| 2012/0009480 A1* | 1/2012 | Ohashi | H01M 10/0565 |
| | | | 429/300 |
| 2012/0141878 A1* | 6/2012 | Ohashi | H01M 10/0525 |
| | | | 429/300 |
| 2012/0251878 A1* | 10/2012 | Ueki | H01M 10/052 |
| | | | 429/211 |
| 2014/0205905 A1* | 7/2014 | Xiao | H01M 4/62 |
| | | | 429/223 |

FOREIGN PATENT DOCUMENTS

| | | |
|---|---|---|
| CN | 101540423 A | 9/2009 |
| JP | 10-241657 A | 9/1998 |
| JP | 2001-035535 A | 2/2001 |
| JP | 2008-262785 A | 10/2008 |
| JP | 2009-527090 A | 7/2009 |
| JP | 2009-199960 A | 9/2009 |
| JP | 2010-170878 A | 8/2010 |
| JP | 2010-244818 A | 10/2010 |
| JP | 2011-154983 A | 8/2011 |
| JP | 2012-069457 A | 4/2012 |
| WO | 2013/136426 A1 | 9/2013 |

OTHER PUBLICATIONS

Chinese Office Action for CN Application No. 201880014258.3 dated Dec. 22, 2021 with English Translation.
Chinese Office Action for CN Application No. 201880014258.3 dated May 20, 2022 with English Translation.

* cited by examiner

SECONDARY BATTERY AND METHOD FOR MANUFACTURING THE SAME

CROSS REFERENCE TO RELATED APPLICATIONS

This application is a National Stage of International Application No. PCT/JP2018/004369 filed Feb. 8, 2018, claiming priority based on Japanese Patent Application No. 2017-034668 filed Feb. 27, 2017.

TECHNICAL FIELD

The present invention relates to a secondary battery in which at least one of a positive electrode and a negative electrode has an insulating layer on an active material layer, and a method for manufacturing the same.

BACKGROUND ART

Secondary batteries are widely used as power sources for portable electronic devices such as smart phones, tablet computers, notebook computers, digital cameras, and the like. In addition, secondary batteries have been expanding their application as power sources for electric vehicles and household power supplies. Among them, since lithium ion secondary batteries are high in energy density and light in weight, they are indispensable energy storage devices for current life.

A conventional battery including a secondary battery has a structure in which a positive electrode and a negative electrode, which are electrodes, are opposed to each other with a separator interposed therebetween. The positive electrode and the negative electrode each have a sheet-like current collector and active material layers formed on both sides of the current collector. The separator serves to prevent a short circuit between the positive electrode and the negative electrode and to effectively move ions between the positive electrode and the negative electrode. Conventionally, a polyolefin system microporous separator made of polypropylene or polyethylene material is mainly used as the separator. However, the melting points of polypropylene and polyethylene materials are generally 110° C. to 160° C. Therefore, when a polyolefin system separator is used for a battery with a high energy density, the separator melts at a high temperature of the battery, and a short circuit may occur between the electrodes in a large area, which cause smoke and ignition of the battery.

Therefore, in order to improve a safety of the battery, a battery is known in which an insulating layer serving as a substitute for the separator is disposed between a positive electrode and a negative electrode. For example, Patent Literature 1 (Japanese Patent Application Laid-Open No. H10-241657) discloses a battery in which an insulating material particle aggregate layer in which insulating material particles are bound by a binder is formed on a surface of a positive electrode active material layer and a surface of a negative electrode active material layer as an insulating layer. Patent Literature 2 (Japanese Patent Application Laid-Open No. 2010-244818) discloses a battery in which a porous layer containing heat-resistant fine particles is formed on a surface of a negative electrode active material layer as an insulating layer. Patent Literature 3 (Japanese Patent Application Laid-Open No. 2012-069457) discloses a battery in which a porous layer containing inorganic fine particles is formed on a surface of a positive electrode active material layer or a negative electrode active material layer as an insulating layer.

Patent Literature 4 (Japanese Patent Application Laid-Open No. 2008-262785) discloses a battery in which a porous insulating layer containing a material having no shutdown characteristic is formed on a surface of a positive electrode active material layer or a negative electrode active material layer. Patent Literature 5 (Japanese Patent Application Laid-Open No. 2009-527090) discloses a battery in which an organic/inorganic composite porous coating layer is formed on a surface of a positive electrode or a negative electrode as an insulating layer.

Patent Literature 4 describes that a gel electrolyte or a solid electrolyte may be used as an electrolyte. Further, Patent Literature 5 describes that a gel-type organic/inorganic composite electrolyte can be formed by a reaction of an electrolytic solution and a polymer by injection of the electrolytic solution when a polymer capable of gelation at the time of impregnation of the electrolytic solution is used as a component of the organic/inorganic composite porous coating layer which is an insulating layer. Generally, the gel electrolyte is used for the purpose of suppressing the liquid leakage of the secondary battery.

CITATION LIST

Patent Literature

Patent Literature 1: Japanese Patent Laid-Open No. H10-241657

Patent Literature 2: Japanese Patent Laid-Open No. 2010-244818

Patent Literature 3: Japanese Patent Laid-Open No. 2012-069457

Patent Literature 4: Japanese Patent Laid-Open No. 2008-262785

Patent Literature 5: Japanese Patent Laid-Open No. 2009-527090

SUMMARY OF INVENTION

Technical Problem

However, when the positive electrode and the negative electrode are disposed opposite to each other via the insulating layer as in the batteries described in Patent Literatures 1 to 5, the gas generated in the active material layer of the electrode during charging of the battery may move in the electrolytic solution (electrolyte) and incorporated into the insulating layer. The gas incorporated into the insulating layer is present as bubbles in the insulating layer to inhibit ion conduction in the insulating layer. Therefore, ions are deposited as metal around bubbles generated in the insulating layer, and the metal deposited in the insulating layer may cause a short circuit between the positive electrode and the negative electrode, which may cause the battery to smoke or ignite.

One of the objects of the present invention is to suppress a short circuit due to metal deposition in an insulating layer in a secondary battery in which a positive electrode and a negative electrode are disposed to face each other via the insulating layer.

Solution to Problem

A secondary according to the present invention comprises:

a battery element including at least one positive electrode and at least one negative electrode, a casing which seals the battery element together with an electrolyte, wherein at least one of the positive electrode and the negative electrode comprises a current collector, an active material layer formed on at least one surface of the current collector and insulating layer formed on a surface of the active material layer, and the electrolyte includes an electrolyte component including a solvent and a support salt and a crosslinked gelling agent, the crosslinked gelling agent exists at least between the active material layer of the positive electrode and the active material layer of the negative electrode, and a ratio Rg of the gelling agent to 100% by mass of the electrolyte component in between the active material layer of the positive electrode and the active material layer of the negative electrode is 0<Rg≤5% by mass.

A method for manufacturing a secondary battery comprises:

preparing at least one positive electrode and at least one negative electrode, at least one of the positive electrode and the negative electrode comprises a current collector, an active material layer formed on at least one surface of the current collector and an insulating layer formed on a surface of the active material layer, preparing an electrolyte which includes an electrolyte component including a solvent and a supporting salt and a gelling agent, and a ratio Rg of the gelling agent to 100% by mass of the electrolyte component is 0<Rg≤5% by mass, enclosing the battery element in which the positive electrode and the negative electrode are alternately laminated and the electrolyte in a bag-like casing in a state in which the electrolyte exists between at least the active material layer of the positive electrode and the active material layer of the negative electrode, sealing the casing containing the battery element and the electrolyte, and gelling the electrolyte before or after sealing the casing.

Advantageous Effects of Invention

According to the present invention, it is possible to suppress a short circuit due to metal deposition in an insulating layer in a secondary battery in which a positive electrode and a negative electrode are disposed to face each other via an insulating layer.

DESCRIPTION OF EMBODIMENTS

Figure 1:
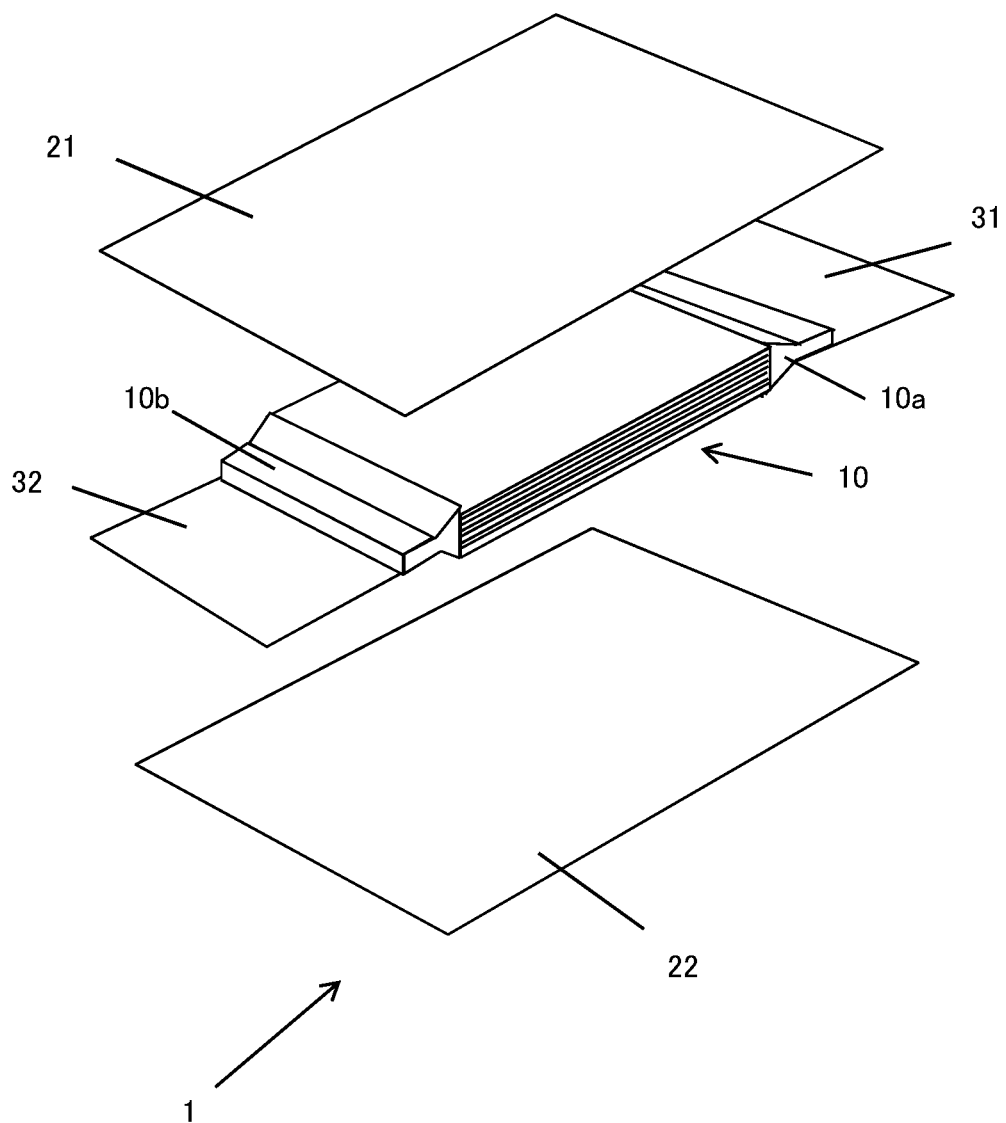
FIG. 1 is an exploded perspective view of a secondary battery according to one embodiment of the present invention.

Referring to FIG. 1, an exploded perspective view of a secondary battery 1 according to one embodiment of the present invention is shown, which comprises a battery element 10 and a casing enclosing the battery element 10 together with an electrolyte. The casing has casing members 21, 22 that enclose the battery element 10 from both sides in the thickness direction thereof and seal outer circumferential portions thereof to thereby seal the battery element 10 and the electrolyte. A positive electrode terminal 31 and a negative electrode terminal 32 are respectively connected to the battery element 10 with protruding part of them from the casing.

Figure 2:
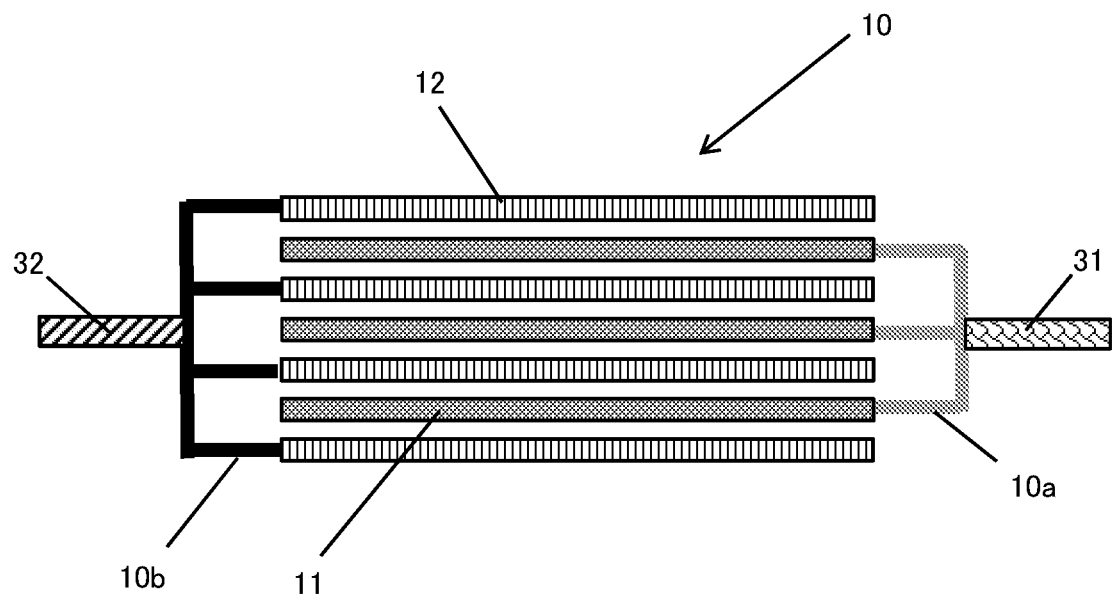
FIG. 2 is a schematic cross-sectional view of a battery element shown in FIG. 1.

As shown in FIG. 2, the battery element 10 has a configuration in which a plurality of positive electrodes 11 and a plurality of negative electrodes 12 are disposed so as to be alternately positioned.

Figure 3:
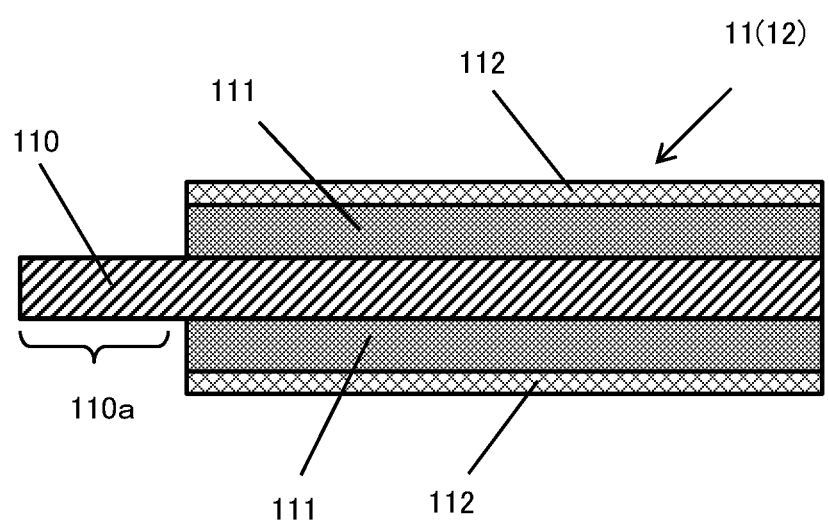
FIG. 3 is a schematic cross-sectional view showing the configuration of a positive electrode and a negative electrode shown in FIG. 2.

Structures of the positive electrode 11 and the negative electrode 12 will be described with further reference to FIG. 3. In the structure shown in FIG. 3, the positive electrode 11 and the negative electrode 12 are not particularly distinguished, but the structure is applicable to both the positive electrode 11 and the negative electrode 12. In the present specification, the positive electrode 11 and the negative electrode 12 may be collectively referred to as "electrode" in a case where these are not distinguished.

The positive electrode 11 includes a current collector 110 which can be formed of a metal foil and an active material layer 111 formed on one or both surfaces of the current collector 110. The active material layer 111 is preferably formed in a rectangular shape in plan view, and the current collector 110 has a shape having an extended portion 110a extending from a region where the active material layer 111 is formed.

In a state where the positive electrode 11 and the negative electrode 12 are laminated, the extended portion 110a of the positive electrode 11 is formed at a position overlapping with the extended portion 110a of the other positive electrode 11 but not overlapping with the extended portion 110a of the negative electrode 12. With such arrangement of the extended portions 110a, in the plurality of positive electrodes 11, the respective extended portions 110a are collected and welded together to form a positive electrode tab 10a (see FIG. 1). Likewise, in the plurality of negative electrodes 12, the respective extended portions 110a are collected and welded together to form a negative electrode tab 10b (see FIG. 1). As shown in FIG. 1, a positive electrode terminal 31 is electrically connected to the positive electrode tab 10a and a negative electrode terminal 32 is electrically connected to the negative electrode tab 10b.

At least one of the positive electrode 11 and the negative electrode 12 further includes an insulating layer 112 formed on the active material layer 111. The insulating layer 112 is formed such that the active material layer 111 is not exposed in plan view. In the case where the active material layer 111 is formed on both surfaces of the current collector 110, the insulating layer 112 may be formed on both of the active materials 111, or may be formed only on one of the active materials 111.

Figure 4A:
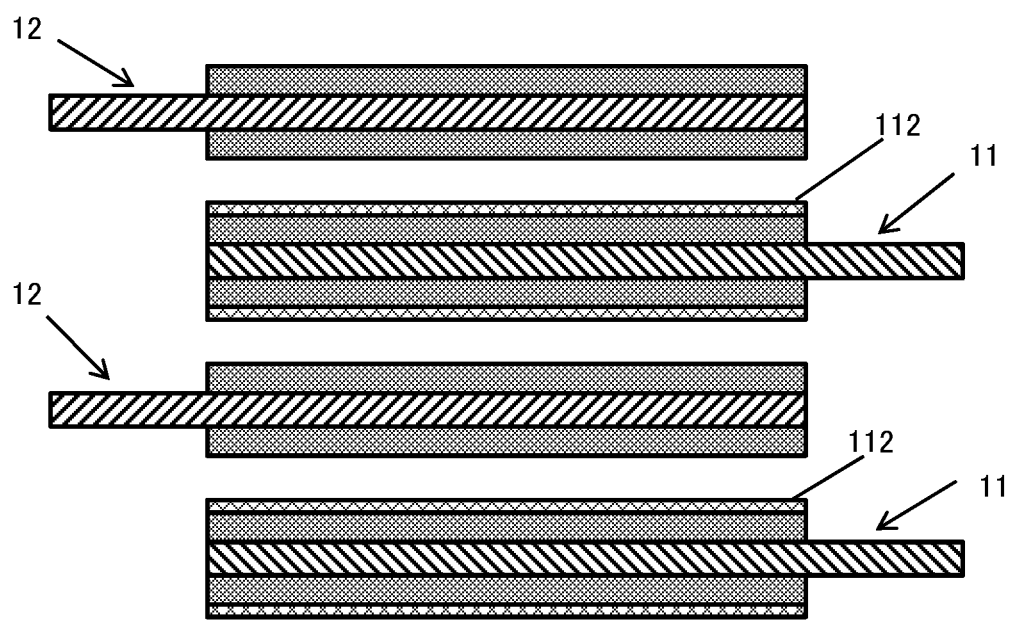
FIG. 4A is a cross-sectional view showing an example of arrangement of the positive electrode and the negative electrode in the battery element.
Figure 4B:
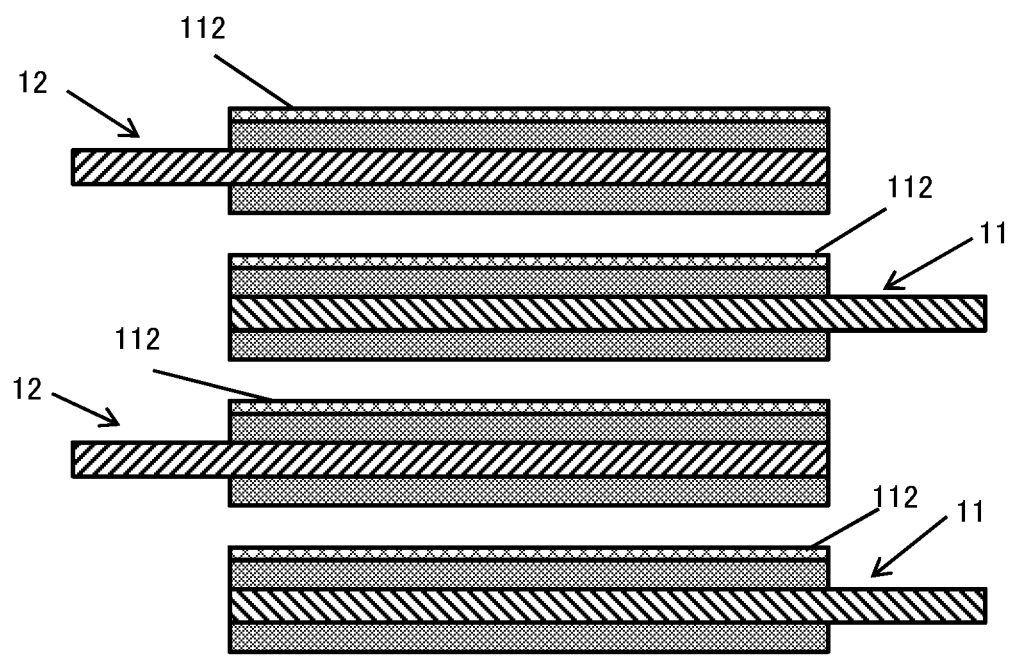
FIG. 4B is a cross-sectional view showing another example of arrangement of the positive electrode and the negative electrode in the battery element.

Some examples of the arrangement of the positive electrode 11 and the negative electrode 12 having such a structure are shown in FIGS. 4A and 4B. In the arrangement shown in FIG. 4A, the positive electrode 11 having the insulating layer 112 on both sides and the negative electrode 12 not having the insulating layer are alternately laminated. In the arrangement shown in FIG. 4B, the positive electrode 11 and the negative electrode 12 having the insulating layer 112 on only one side are alternately laminated in such a manner that the respective insulating layers 112 do not face each other. In the structures shown in FIGS. 4A and 4B, since the insulating layer 112 exists between the positive electrode 11 and the negative electrode 12, the separator (not shown) can be omitted.

The structure and arrangement of the positive electrode 11 and the negative electrode 12 are not limited to the above examples and various modifications are possible as long as the insulating layer 112 is provided on one surface of at least one of the positive electrode 11 and the negative electrode 12. For example, in the structures shown in FIGS. 4A and 4B, the relationship between the positive electrode 11 and the negative electrode 12 can be reversed. Moreover, it is also possible to arrange a separator (not shown) between the positive electrode 11 and the negative electrode 12.

Since the battery element 10 having a planar laminated structure as illustrated has no portion having a small radius of curvature (a region close to a winding core of a winding structure), the battery element 10 has an advantage that it is less susceptible to the volume change of the electrode due to charging and discharging as compared with the battery element having a wound structure. That is, the battery element having a planar laminated structure is effective for an electrode assembly using an active material that is liable to cause volume expansion.

Figure 5:
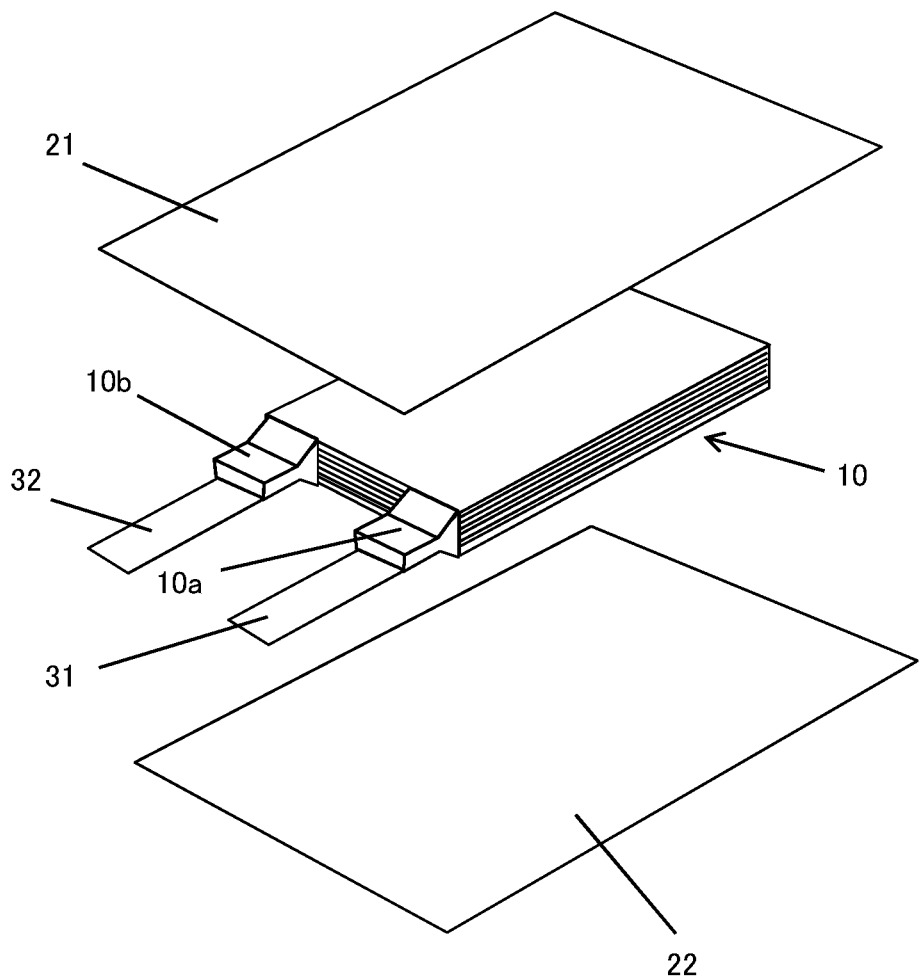
FIG. 5 is an exploded perspective view of a battery according to another embodiment of the present invention.

In the embodiment shown in FIGS. 1 and 2, the positive electrode terminal 31 and the negative electrode terminal 32 are drawn out in opposite directions, but the directions in which the positive electrode terminal 31 and the negative electrode terminal 32 are drawn out may be arbitrary. For example, as shown in FIG. 5, the positive electrode terminal 31 and the negative electrode terminal 32 may be drawn out from the same side of the battery element 10. Although not shown, the positive electrode terminal 31 and the negative electrode terminal 32 may also be drawn out from two adjacent sides of the battery element 10. In both of the above case, the positive electrode tab 10a and the negative electrode tab 10b can be formed at positions corresponding to the direction in which the positive electrode terminal 31 and the negative electrode terminal 32 are drawn out.

Furthermore, in the illustrated embodiment, the battery element 10 having a laminated structure having a plurality of positive electrodes 11 and a plurality of negative electrodes 12 is shown. However, the battery element having the winding structure may have one positive electrode 11 and one negative electrode 12.

The important points in this embodiment are that at least one of the positive electrode 11 and the negative electrode 12 has an insulating layer 112 which can be used as a substitute for a separator, and that the electrolyte includes a crosslinked gelling agent in addition to an electrolyte component including a supporting salt (supporting electrolyte) and a solvent, the crosslinked gelling agent exists at least between the active material layer of the positive electrode 11 and the active material layer of the negative electrode 12, and the ratio Rg (mass %) of the gelling agent to 100% by mass of the electrolyte component in between the active material layer of the positive electrode 11 and the active material layer of the negative electrode 12 is $0 < Rg \leq 5\%$ by mass.

Since the electrolyte has a crosslinked gelling agent, the electrolyte becomes gelled and loses fluidity. When the battery is charged, a gas is generated in the active material layer, and the gas exists as bubbles in the electrolyte. However, since the electrolyte is gelled, the movement of the bubbles in the electrolyte is suppressed, and the bubbles are less likely to move into the insulating layer covering the active material layer 111. Therefore, since the ion conduction is inhibited by the bubbles, even if ions are deposited as a metal around the bubbles, the possibility that the metal shorts the positive electrode 11 and the negative electrode 12 via the insulating layer 112 is extremely low.

In order to well suppress the movement of the bubbles generated in the active material layer 111, the gelling agent preferably exists at least in the insulating layer 112 or on the insulating layer 112. More preferably, the gelling agent exists at least whole of the insulating layer 112. More preferably, the gelling agent exists in both the insulating layer 112 and the active material layer 111.

The higher the proportion of the gelling agent included in the electrolyte, the higher the viscosity of the electrolyte. The viscosity of the electrolyte affects a bubble retention effect and an ionic conductivity. The higher the proportion of the gelling agent, the higher the bubble retaining effect is obtained, while the ion conductivity decreases. Conversely, the lower the proportion of the gelling agent, the lower the bubble retention effect, but the higher the ion conductivity.

Therefore, in order to ensure sufficient performance as a battery and to suppress a short circuit caused by the movement of the bubbles generated in the active material layer, it is important that the crosslinked gelling agent exists at least between the active material layer of the positive electrode and the active material layer of the negative electrode. Even if the ratio Rg (% by mass) of the gelling agent to 100% by mass of the electrolyte component is a very small amount, the bubble retaining effect can be exhibited as long as the electrolyte includes the gelling agent. For example, in the present embodiment, the ratio Rg of the gelling agent to 100% by mass of the electrolyte component is 0.2% by mass to 5% by mass. In order to further improve the cell retention effect, the ratio Rg of the gelling agent is more preferably 0.5% by mass or more, and still more preferably 1.0% by mass or more. Further, in order to further improve the ion conductivity, the ratio Rg of the gelling agent is preferably 3% by mass or less, and more preferably 2% by mass or less.

The gelled electrolyte is provided by a gelling agent (also referred to as a gel forming agent). The gelling agent includes at least one of monomers, oligomers and polymers that form a three-dimensional network by being crosslinked. The gelling agent is crosslinked, and the electrolyte component is absorbed inside the three-dimensional network structure, whereby the electrolyte is gelled. The electrolyte may be gelled entirely or only partially. In other words, in the electrolyte, a gelled region which is a region formed by gelation may exist in the entire electrolyte or in only a part of the electrolyte. When the gelled region exists only in part of the electrolyte, the gelled region may exist at least between the active material layer of the positive electrode and the active material layer of the negative electrode.

The gelling agent differs in the mode of crosslinking depending on its type, and the obtained gel can be classified into two types, a physical gel and a chemical gel, depending on the mode of crosslinking. The physical gel is a gel formed by a gelling agent in which molecular chains are non-covalently crosslinked. The chemical gel is a gel formed by a gelling agent in which molecular chains are covalently crosslinked, and the bonds are not broken by the molecular motion of the molecular chains, and the network structure is maintained as it was when the gel was formed. In the present embodiment, any gel of the physical gel and the chemical gel is applicable.

In the case of using the gelling agent that forms the physical gel, gelation proceeds by mixing the electrolyte component and the gelling agent. Therefore, due to the problem of viscosity, it is not possible to pour the mixed state of the electrolyte component and the gelling agent into the laminated structure. Therefore, by applying the electrolyte including the gelling agent on the surface of the positive electrode and/or the negative electrode before arranging the positive electrode and the negative electrode opposite to each other, the gelled region can well exist in the battery element, particularly the positive electrode active material layer and the negative electrode active material layer. However, in this case, since the gelled region exists only on the surface of the electrode, the gas generated in the active material layer may easily move in the active material layer and reach the insulating layer.

On the other hand, in the case of using the gelling agent that forms the chemical gel, gelation proceeds by causing a crosslinking reaction of the gelling agent after mixing the electrolyte component and the gelling agent. The crosslinking reaction can be proceeded by addition of a crosslinking initiator or by applying heat from the outside. Therefore, for example, by using a gelling agent in which the crosslinking reaction proceeds by applying heat, as described in detail later, the electrolyte component can be gelled by pouring the electrolyte component including the gelling agent into the laminate structure and then heating. By forming the gelled region in such a procedure, it is possible to suppress the decrease in the pouring property. In addition, since the gelled region can uniformly exist in the laminated structure, the gas generated in the active material layer can be suppressed from moving to the insulating layer.

From the above, in the present embodiment, the gel is more preferably the chemical gel in which the fluidity of the electrolyte is more suppressed than the physical gel.

When the gelled region included in the electrolyte is a gelled region obtained by a gelling agent that forms a physical gel, for example, the electrolyte having the gelled region can be obtained by mixing the electrolyte component including a support salt and a solvent with the gelling agent.

In this case, a gelled electrolyte can be obtained by mixing the electrolyte component and the gelling agent. Therefore, by appropriately adjusting the addition amount of the gelling agent and applying it, a gelled electrolyte can be formed in layers on the surface of the positive electrode and/or the negative electrode. Thereafter, the positive electrode and the negative electrode are alternately stacked to produce a battery element, whereby a gelled electrolyte can be present between the active material layer of the positive electrode and the active material layer of the negative electrode. The battery element is enclosed in a casing, and the casing containing the battery element is sealed, whereby a secondary battery can be manufactured.

However, if the electrolyte remains gelled, handling during manufacture of the battery element becomes difficult. Therefore, it is preferable to fix the gelling agent on the surface of the positive electrode and/or the negative electrode by applying the electrolyte and then drying the electrolyte. When the electrolyte is dried, after the battery element is contained in the casing, the electrolyte can be gelled by additionally pouring the electrolyte component into the casing and impregnating the battery element.

The electrolyte component to be additionally poured can be referred to as an electrolyte including no gelling agent. Therefore, when the electrolyte component is additionally poured, a part of the gelling agent may flow out from the electrolyte applied to the surface of the positive electrode and/or the negative electrode to the additionally poured electrolyte component. This causes a decrease in the proportion of the gelling agent between the active material layer of the positive electrode and the active material layer of the negative electrode. However, since the positive electrode and the negative electrode are in the form of a flat plate, and the gelling agent exists in a state of being sandwiched between the flat positive electrode and the negative electrode, the electrolyte component penetrates from the outer peripheral portion to the central portion of the positive electrode and the negative electrode by additional pouring of the electrolyte component. Therefore, gelation of the electrolyte between the positive electrode and the negative electrode proceeds from the outer peripheral portion to the central portion of the positive electrode and the negative electrode. Since the gelation of the electrolyte between the positive electrode and the negative electrode proceeds from the peripheral portion, the gelled electrolyte at the peripheral portion performs the function of a dike. Therefore, it can be said that the gelling agent does not substantially flow out between the positive electrode and the negative electrode.

On the other hand, when the gelled region included in the electrolyte is a gelled region obtained by a gelling agent that forms a chemical gel, an electrolyte having a gelled region can be obtained, for example, as follows. First, a battery element, which is a laminate in which positive electrodes and negative electrodes are alternately laminated, is contained in a bag-like casing. Next, the electrolyte in the form of a solution in which the solvent including the support salt and the gelling agent are mixed is poured into the casing containing the battery element, and the battery element is impregnated with the electrolyte in the form of a solution. After pouring the electrolyte, the casing is sealed. After the casing is sealed, the gelling agent is crosslinked by, for example, heat-treating the electrolyte. Thus, the electrolyte in the form of the solution including the gelling agent is poured into the casing containing the battery element and then the gelling agent is cross-linked, so that the electrolyte is gelled at least in a state where the electrolyte penetrates the insulating layer. Thus, the electrolyte having the gelled region exists at least over the entire insulating layer, and as a result, the movement of the bubbles generated in the active material layer can be favorably suppressed.

As described above, the preferred gelation method of the electrolyte is different between physical gel and chemical gel. Due to this, the distribution of gelled regions in the thickness direction of the electrode (the laminating direction of the active material layer and the insulating layer) differs between the physical gel and the chemical gel.

In the case of a physical gel type electrolyte obtained by mixing an electrolyte component and a gelling agent, the electrolyte is disposed on the surface of the electrode by being applied to the surface of the electrode. In this case, since the electrolyte is applied in a gelled state by mixing, most of the applied electrolyte exists in the form of a layer on the surface of the electrode and does not impregnate much in the insulating layer or the active material layer. The portion of the electrode that is not impregnated with the gelled electrolyte is impregnated with the additionally poured electrolyte component that does not include a gelling agent. As a result, the electrolyte is impregnated into the electrode (specifically, the active material layer and the insulating layer), but the gelled region which is a gelled electrolyte exists in a portion of the specific thickness from the surface of the insulating layer to the surface of the current collector on which the active material layer is formed. Only the electrolyte component is impregnated in the remaining portions of the active material layer and the insulating layer where no gelled region is present.

The thickness of the gelled region in the direction from the surface of the insulating layer to the current collector depends on the ease of impregnation of the applied electrolyte into the insulating layer and the active material layer, in other words, the proportion of the gelling agent to 100% by mass of the electrolyte component in the applied electrolyte. In general, as the proportion of the gelling agent is lower, the electrolyte is more easily impregnated into the insulating layer and the active material layer, resulting in a thicker gelled region.

On the other hand, in the case of a chemical gel type electrolyte obtained by heat treatment after mixing the electrolyte component and the gelling agent, the electrolyte before gelation is poured into the casing containing the battery element, the electrolyte is impregnated into the electrode, and then the electrolyte is gelled. Therefore, the gelled region exists in the range from the surface of the insulating layer to the portion in the vicinity of the current collector, in other words, substantially the whole of the active material layer and the insulating layer.

In order to prevent a short circuit due to movement of bubbles generated in the active material layer by charging, it is most preferable that the crosslinked gelling agent penetrates into the electrode at least at the electrode surface, and the permeability of the crosslinked gelling agent from the electrode surface side to the current collector side is 100%. In that respect, it is desirable to be gelated the electrolyte by using a gelling agent that forms a chemical gel, injecting an electrolyte before gelation into the casing containing the battery element, and impregnating the electrolyte into the electrode, and then crosslinking the gelling agent. However, if the permeability of the crosslinked gelling agent into the electrode is greater than 0, for example, about 0.1%, it is possible to suppress a short circuit due to the movement of bubbles generated in the active material layer. The state in which the permeability of the crosslinked gelling agent into the electrode is 0.1% is a state in which the gelling agent penetrates into the electrode to a small extent, from the surface side of the insulating layer to the current collector side.

Here, "the permeability of the crosslinked gelling agent into the electrode" is a value representing, in percentage, the proportion of the thickness of the region where the crosslinked gelling agent exists from the surface side of the electrode (in this embodiment, the surface side of the insulating layer) to the thickness of the entire layer formed on the current collector (in this embodiment, the active material layer and the insulating layer) on one side of the current collector of the electrode.

Whether the gel is a physical gel or a chemical gel can be confirmed, for example, by the following method. In the case of physical gels, the crosslinked gelling agent can be eluted with a solvent such as NMP (N-methyl-2-pyrrolidone). On the other hand, in the case of a chemical gel, the crosslinked gelling agent cannot be eluted with a solvent such as NMP. Therefore, when the electrode is washed with a solvent such as NMP, if the crosslinked gelling agent does not remain in the electrode, the electrolyte can be determined to include a gelled region in which the gelling agent that forms a physical gel is crosslinked. On the other hand, the crosslinked gelling agent remains on the electrode even if the electrode is washed with a solvent such as NMP, the electrolyte can be determined to include a gelled region in which the gelling agent that forms a chemical gel is crosslinked.

On the other hand, the proportion of the gelling agent to 100% by mass of the electrolyte component in between the positive electrode active material layer and the negative electrode active material layer can be confirmed, for example, by the following method.

In order to confirm the proportion of the gelling agent, the electrolyte is first extracted from the battery. Since the electrolyte exists at least on the surface of the electrode, the battery element taken out of the casing is disassembled to observe the surface of the electrode. If the electrolyte exists in the form of a layer on the surface of the electrode, the electrolyte can be extracted by scraping the electrolyte from the surface of the electrode. For example, in the case of forming the layer of the electrolyte by applying the gelled electrolyte to the electrode surface, the electrolyte can be extracted by this method. The proportion of the gelling agent can be determined by analyzing the extracted electrolyte by an appropriate method. Since the electrolyte is extracted from the surface of the electrode, the proportion of the gelling agent determined can be regarded as the proportion of the gelling agent in between the active material layer of the positive electrode and the active material layer of the negative electrode.

However, it is very difficult to extract the electrolyte from the electrode surface when the gelation of the electrolyte is carried out after the liquid electrolyte is impregnated into the electrode. In this case, it is considered that a gelled electrolyte exists throughout the inside of the casing. Thus, the electrolyte can be extracted by scraping the electrolyte adhering to the inner surface of the casing, which is opened when the battery element is taken out, from the inner surface of the casing. The gelling agent is considered to be uniformly distributed in the gelled electrolyte. Therefore, the proportion of the gelling agent determined from the extracted electrolyte can be regarded as the proportion of the gelling agent in between the active material layer of the positive electrode and the active material layer of the negative electrode.

In addition, when the separator is disposed between the positive electrode 11 and the negative electrode 12, the electrolyte is also impregnated in the separator, so the electrolyte can also be extracted from the surface of the separator. The proportion of the gelling agent in the electrolyte at the surface of the separator is considered to be equal to the proportion of the gelling agent in the electrolyte at the electrode surface in contact with the surface of the separator. Therefore, by determining the proportion of the gelling agent in the electrolyte extracted from the surface of the separator, it is possible to estimate the proportion of the gelling agent in the electrolyte at least on the electrode surface in contact with the separator surface from which the electrolyte was extracted. In addition, if used gelling agent is a chemical gel type gelling agent, and if the electrolyte has been impregnated with the electrode and then gelled, it is believed that the gelling agent exists uniformly throughout the layer including the electrode surface, for example, the entire insulating layer, as well as the electrode surface.

From the extracted electrolyte, for example, the proportion of the gelling agent can be determined as follows. Drying the extracted electrolyte leaves a supporting salt and a gelling agent. By dissolving the supporting salt from the mixture of the supporting salt and the gelling agent with a solvent such as diethyl carbonate (DEC) or ethyl methyl carbonate (EMC) and drying again, as a result, only the gelling agent can be extracted from the electrolyte. Assuming that the mass of the scraped electrolyte is Me, the mass of the extracted gelling agent is Mg, and the ratio of the gelling agent to 100% by mass of the electrolyte component is Rg, the Rg can be obtained by the following formula:

$$Rg(mass\ \%) = Mg/(Me-Mg) \times 100.$$

The extracted gelling agent can be qualitatively analyzed by infrared spectroscopy, Raman spectroscopy, or the like.

Hereinafter, parts constituting the battery element 10 and the electrolyte will be described in detail. In the following description, although not particularly limited, elements in the lithium ion secondary battery will be described.

[1] Negative Electrode

The negative electrode has a structure in which, for example, a negative electrode active material is adhered to a negative electrode current collector by a negative electrode binder, and the negative electrode active material is laminated on the negative electrode current collector as a negative electrode active material layer. Any material capable of absorbing and desorbing lithium ions with charge and discharge can be used as the negative electrode active material in the present embodiment as long as the effect of the present invention is not significantly impaired. Normally, as in the case of the positive electrode, the negative electrode is also configured by providing the negative electrode active material layer on the current collector. Similarly to the positive electrode, the negative electrode may also have other layers as appropriate.

The negative electrode active material is not particularly limited as long as it is a material capable of absorbing and desorbing lithium ions, and a known negative electrode active material can be arbitrarily used. For example, it is preferable to use carbonaceous materials such as coke, acetylene black, mesophase microbead, graphite and the like; lithium metal; lithium alloy such as lithium-silicon, lithium-tin; lithium titanate and the like as the negative electrode active material. Among these, carbonaceous materials are most preferably used from the viewpoint of good cycle characteristics and safety and further excellent continuous charge characteristics. One negative electrode active material may be used alone, or two or more negative electrode active materials may be used in combination in any combination and ratio.

Furthermore, the particle diameter of the negative electrode active material is arbitrary as long as the effect of the present invention is not significantly impaired. However, in terms of excellent battery characteristics such as initial efficiency, rate characteristics, cycle characteristics, etc., the particle diameter is usually 1 μm or more, preferably 15 μm or more, and usually about 50 μm or less, preferably about 30 μm or less. Furthermore, for example, it can be also used as the carbonaceous material such as a material obtained by coating the carbonaceous material with an organic substance such as pitch or the like and then calcining the carbonaceous material, or a material obtained by forming amorphous carbon on the surface using the CVD method or the like. Examples of the organic substances used for coating include coal tar pitch from soft pitch to hard pitch; coal heavy oil such as dry distilled liquefied oil; straight run heavy oil such as atmospheric residual oil and vacuum residual oil, crude oil; petroleum heavy oil such as decomposed heavy oil (for example, ethylene heavy end) produced as a by-product upon thermal decomposition of crude oil, naphtha and the like. A residue obtained by distilling these heavy oil at 200 to 400° C. and then pulverized to a size of 1 to 100 μm can also be used as the organic substance. In addition, vinyl chloride resin, phenol resin, imide resin and the like can also be used as the organic substance.

In one embodiment of the present invention, the negative electrode includes a metal and/or a metal oxide and carbon as the negative electrode active material. Examples of the metal include Li, Al, Si, Pb, Sn, In, Bi, Ag, Ba, Ca, Hg, Pd, Pt, Te, Zn, La, and alloys of two or more of these. These metals or alloys may be used as a mixture of two or more. In addition, these metals or alloys may contain one or more non-metall elements.

Examples of the metal oxide include silicon oxide, aluminum oxide, tin oxide, indium oxide, zinc oxide, lithium oxide, and composites of these. In the present embodiment, tin oxide or silicon oxide is preferably contained as the negative electrode active material, and silicon oxide is more preferably contained. This is because silicon oxide is relatively stable and hardly causes reaction with other compounds. Also, for example, 0.1 to 5 mass % of one or more elements selected from nitrogen, boron and sulfur can be added to the metal oxide. In this way, the electrical conductivity of the metal oxide can be improved. Also, the electrical conductivity can be similarly improved by coating the metal or the metal oxide with an electro-conductive material such as carbon by vapor deposition or the like.

Examples of the carbon include graphite, amorphous carbon, diamond-like carbon, carbon nanotube, and composites of these. Highly crystalline graphite has high electrical conductivity and is excellent in adhesiveness with respect to a negative electrode current collector made of a metal such as copper and voltage flatness. On the other hand, since amorphous carbon having a low crystallinity has a relatively small volume expansion, it has a high effect of alleviating the volume expansion of the entire negative electrode, and deterioration due to non-uniformity such as crystal grain boundaries and defects hardly occurs.

The metal and the metal oxide have the feature that the capacity of accepting lithium is much larger than that of carbon. Therefore, the energy density of the battery can be improved by using a large amount of the metal and the metal oxide as the negative electrode active material. In order to achieve high energy density, it is preferable that the content ratio of the metal and/or the metal oxide in the negative electrode active material is high. A larger amount of the metal and/or the metal oxide is preferable, since it increases the capacity of the negative electrode as a whole. The metal and/or the metal oxide is preferably contained in the negative electrode in an amount of 0.01% by mass or more of the negative electrode active material, more preferably 0.1% by mass or more, and further preferably 1% by mass or more. However, the metal and/or the metal oxide has large volume change upon absorbing and desorbing of lithium as compared with carbon, and electrical junction may be lost. Therefore, the amount of the metal and/or the metal oxide in the negative active material is 99% by mass or less, preferably 90% by mass or less, more preferably 80% by mass or less. As described above, the negative electrode active material is a material capable of reversibly absorbing and desorbing lithium ions with charge and discharge in the negative electrode, and does not include other binder and the like.

For example, the negative electrode active material layer may be formed into a sheet electrode by roll-forming the above-described negative electrode active material, or may be formed into a pellet electrode by compression molding. However, usually, as in the case of the positive electrode active material layer, the negative electrode active material layer can be formed by applying and drying an application liquid on a current collector, where the application liquid may be obtained by slurrying the above-described negative electrode active material, a binder, and various auxiliaries contained as necessary with a solvent.

The negative electrode binder is not particularly limited, and examples thereof include polyvinylidene fluoride, vinylidene fluoride-hexafluoropropylene copolymer, vinylidene fluoride-tetrafluoroethylene copolymer, styrene-butadiene copolymer rubber, polytetrafluoroethylene, polypropylene, polyethylene, acrylic, polyimide, polyamide imide and the like. In addition to the above, styrene butadiene rubber (SBR) and the like can be included. When an aqueous binder such as an SBR emulsion is used, a thickener such as carboxymethyl cellulose (CMC) can also be used. The amount of the negative electrode binder to be used is preferably 0.5 to 20 parts by mass relative to 100 parts by mass of the negative electrode active material from the viewpoint of a trade-off between "sufficient binding strength" and "high energy". The negative electrode binders may be mixed and used.

As the material of the negative electrode current collector, a known material can be arbitrarily used, and for example, a metal material such as copper, nickel, stainless steel, aluminum, chromium, silver and an alloy thereof is preferably used from the viewpoint of electrochemical stability. Among them, copper is particularly preferable from the viewpoint of ease of processing and cost. It is also preferable that the negative electrode current collector is also subjected to surface roughening treatment in advance. Further, the shape of the current collector is also arbitrary, and examples thereof include a foil shape, a flat plate shape and a mesh shape. A perforated type current collector such as an expanded metal or a punching metal can also be used.

The negative electrode can be produced, for example, by forming a negative electrode active material layer containing a negative electrode active material and a negative electrode binder on a negative electrode current collector. Examples of a method for forming the negative electrode active material layer include a doctor blade method, a die coater method, a CVD method, a sputtering method, and the like. After forming the negative electrode active material layer in advance, a thin film of aluminum, nickel or an alloy thereof may be formed by a method such as vapor deposition, sputtering or the like to obtain a negative electrode current collector.

An electroconductive auxiliary material may be added to a coating layer containing the negative electrode active material for the purpose of lowering the impedance. Examples of the electroconductive auxiliary material include flaky, sooty, fibrous carbonaceous microparticles and the like such as graphite, carbon black, acetylene black, vapor grown carbon fiber (for example, VGCF (registered trademark) manufactured by Showa Denko K.K.), and the like.

[2] Positive Electrode

The positive electrode refers to an electrode on the high potential side in a battery. As an example, the positive electrode includes a positive electrode active material capable of reversibly absorbing and desorbing lithium ions with charge and discharge, and has a structure in which a positive electrode active material is laminated on a current collector as a positive electrode active material layer integrated with a positive electrode binder. In one embodiment of the present invention, the positive electrode has a charge capacity per unit area of 3 mAh/cm$^2$ or more, preferably 3.5 mAh/cm$^2$ or more. From the viewpoint of safety and the like, the charge capacity per unit area of the positive electrode is preferably 15 mAh/cm$^2$ or less. Here, the charge capacity per unit area is calculated from the theoretical capacity of the active material. That is, the charge capacity of the positive electrode per unit area is calculated by (theoretical capacity of the positive electrode active material used for the positive electrode)/(area of the positive electrode). Note that the area of the positive electrode refers to the area of one surface, not both surfaces of the positive electrode.

The positive electrode active material in the present embodiment is not particularly limited as long as it is a material capable of absorbing and desorbing lithium, and can be selected from several viewpoints. A high-capacity compound is preferably contained from the viewpoint of high energy density. Examples of the high-capacity compound include nickel lithate (LiNiO$_2$) and a lithium nickel composite oxide obtained by partially replacing Ni of nickel lithate with another metal element, and a layered lithium nickel composite oxide represented by formula (A) below is preferable.

$$Li_yNi_{(1-x)}M_xO_2 \quad (A)$$

(provided that $0 \leq x < 1$, $0 < y \leq 1.2$, and M is at least one element selected from the group consisting of Co, Al, Mn, Fe, Ti, and B.)

From the viewpoint of high capacity, the Ni content is preferably high, or that is to say, x is less than 0.5 in formula (A), and more preferably 0.4 or less. Examples of such compounds include $Li_\alpha Ni_\beta Co_\gamma Mn_\delta O_2$ ($0<\alpha 1.2$, preferably $1 \leq \alpha 1.2$, $\beta+\gamma+\delta=1$, $\beta \geq 0.7$, and $\gamma \leq 0.2$) and $Li_\alpha Ni_{62} Co_\gamma Al_\delta O_2$ ($0<\alpha 1.2$ preferably $1 \leq \alpha 1.2$, $\beta+\gamma+\delta=1$, $\beta \geq 0.6$ preferably $\beta \geq 0.7, \gamma \leq 0.2$), and, in particular, $LiNi_\beta Co_\gamma Mn_\delta O_2$ ($0.75 \leq \beta \leq 0.85$, $0.05 \leq \gamma 0.15$, $0.10 \leq \delta 0.20$). More specifically, for example, $LiNi_{0.8}Co_{0.05}Mn_{0.15}O_2$, $LiNi_{0.8}Co_{0.1}Mn_{0.1}O_2$, $LiNi_{0.8}Co_{0.15}Al_{0.05}O_2$, and $LiNi_{0.8}Co_{0.1}Al_{0.1}O_2$ can be preferably used.

From the viewpoint of heat stability, it is also preferable that the Ni content does not exceed 0.5, or that is to say, x is 0.5 or more in formula (A). It is also preferable that a certain transition metal does not account for more than half. Examples of such compounds include $Li_\alpha Ni_\beta Co_\gamma Mn_\delta O_2$ ($0<\alpha \leq 1.2$ preferably $1 \leq \alpha \leq 1.2$, $\beta+\gamma+\delta=1$, $0.2 \leq \beta \leq 0.5$, $0.1 \leq \gamma \leq 0.4$, $0.1 \leq \delta \leq 0.4$). More specific examples include $LiNi_{0.4}Co_{0.3}Mn_{0.3}O_2$ (abbreviated as NCM433), $LiNi_{1/3}Co_{1/3}Mn_{1/3}O_2$, $LiNi_{0.5}Co_{0.2}Mn_{0.3}O_2$ (abbreviated as NCM523), and $LiNi_{0.5}Co_{0.3}Mn_{0.2}O_2$ (abbreviated as NCM532) (provided that these compounds include those in which the content of each transition metal is varied by about 10%).

Also, two or more compounds represented by formula (A) may be used as a mixture, and, for example, it is also preferable to use NCM532 or NCM523 with NCM433 in a range of 9:1 to 1:9 (2:1 as a typical example) as a mixture. Moreover, a battery having a high capacity and a high heat stability can be formed by mixing a material having a high Ni content (x is 0.4 or less) with a material having a Ni content not exceeding 0.5 (x is 0.5 or more, such as NCM433) in formula (A).

Other than the above positive electrode active materials, examples include lithium manganates having a layered structure or a spinel structure, such as $LiMnO_2$, $Li_xMn_2O_4$ (0<x<2), $Li_2MnO_3$, and $Li_xMn_{1.5}Ni_{0.5}O_4$ (0<x<2); $LiCoO_2$ and those obtained by partially replacing these transition metals with other metals; those having an excess of Li based on the stoichiometric compositions of these lithium transition metal oxides; and those having an olivine structure such as $LiFePO_4$. Moreover, materials obtained by partially replacing these metal oxides with Al, Fe, P, Ti, Si, Pb, Sn, In, Bi, Ag, Ba, Ca, Hg, Pd, Pt, Te, Zn, La, or the like can be used as well. One of the positive electrode active materials described above may be used singly, or two or more can be used in combination.

A positive electrode binder similar to the negative electrode binder can be used. Among them, polyvinylidene fluoride or polytetrafluoroethylene is preferable from the viewpoint of versatility and low cost, and polyvinylidene fluoride is more preferable. The amount of the positive electrode binder used is preferably 2 to 15 parts by mass relative to 100 parts by mass of the positive electrode active material from the viewpoint of a trade-off between "sufficient binding strength" and "high energy".

An electroconductive auxiliary material may be added to a coating layer containing the positive electrode active material for the purpose of lowering the impedance. Examples of the conductive auxiliary material include flaky, sooty, fibrous carbonaceous microparticles and the like such as graphite, carbon black, acetylene black, vapor grown carbon fiber (for example, VGCF manufactured by Showa Denko K.K.) and the like.

A positive electrode current collector similar to the negative electrode current collector can be used. In particular, as the positive electrode, a current collector using aluminum, an aluminum alloy, iron, nickel, chromium, molybdenum type stainless steel is preferable.

An electroconductive auxiliary material may be added to a positive electrode active material layer containing the positive electrode active material for the purpose of lowering the impedance. Examples of the conductive auxiliary material include carbonaceous microparticles such as graphite, carbon black and acetylene black.

[3] Insulating Layer (Material and Manufacturing Method etc.)

The insulating layer can be formed by applying a slurry composition for an insulating layer so as to cover a part of the active material layer of the positive electrode or the negative electrode and drying and removing a solvent. Although the insulating layer may be formed on only one side of the active material layer, there is an advantage that the warpage of the electrode can be reduced by forming the insulating layer on both side (in particular, as a symmetrical structure).

A slurry for the insulating layer is a slurry composition for forming a porous insulating layer. Therefore, the "insulating layer" can also be referred to as "porous insulating layer". The slurry for the insulating layer comprises non-conductive particles and a binder (or a binding agent) having a specific composition, and the non-conductive particles, the binder and optional components are uniformly dispersed as a solid content in a solvent.

It is desirable that the non-conductive particles stably exist in the use environment of the lithium ion secondary battery and are electrochemically stable. As the non-conductive particles, for example, various inorganic particles, organic particles and other particles can be used. Among them, inorganic oxide particles or organic particles are preferable, and in particular, from the viewpoint of high thermal stability of the particles, it is more preferable to use inorganic oxide particles. Metal ions in the particles sometimes form salts near the electrode, which may cause an increase in the internal resistance of the electrode and a decrease in cycle characteristics of the secondary battery. The other particles include particles to which conductivity is given by surface treatment of the surface of fine powder with a non-electrically conductive substance. The fine powder can be made from a conductive metal, compound and oxide such as carbon black, graphite, $SnO_2$, ITO and metal powder. Two or more of the above-mentioned particles may be used in combination as the non-conductive particles.

Examples of the inorganic particles include inorganic oxide particles such as aluminum oxide, silicon oxide, magnesium oxide, titanium oxide, $BaTiO_2$, ZrO, alumina-silica composite oxide; inorganic nitride particles such as aluminum nitride and boron nitride; covalent crystal particles such as silicone, diamond and the like; sparingly soluble ionic crystal particles such as barium sulfate, calcium fluoride, barium fluoride and the like; clay fine particles such as talc and montmorillonite. These particles may be subjected to element substitution, surface treatment, solid solution treatment, etc., if necessary, and may be used singly or in combination of two or more kinds. Among them, inorganic oxide particles are preferable from the viewpoints of stability in the electrolytic solution and potential stability.

The shape of the inorganic particles is not particularly limited, and may be spherical, needle-like, rod-like, spindle-shaped, plate-like, or the like. From the viewpoint of effectively preventing penetration of the needle-shaped object, the shape of the inorganic particle may be in the form of a plate.

When the shape of the inorganic particles is plate-like, it is preferable to orient the inorganic particles in the porous film so that the flat surfaces thereof are substantially parallel to the surface of the porous film. By using such a porous film, the occurrence of a short circuit of the battery can be suppressed better. By orienting the inorganic particles as described above, it is conceivable that the inorganic particles are arranged so as to overlap with each other on a part of the flat surface, and voids (through holes) from one surface to the other surface of the porous film are formed not in a straight but in a bent shape (that is, the curvature ratio is increased). This is presumed to prevent the lithium dendrite from penetrating the porous film and to better suppress the occurrence of a short circuit.

Examples of the plate-like inorganic particles preferably used include various commercially available products such as "SUNLOVELY" ($SiO_2$) manufactured by AGC Si-Tech Co., Ltd., pulverized product of "NST-B 1" ($TiO_2$) manufactured by Ishihara Sangyo Kaisha, Ltd., plate like barium sulfate "H series", "HL series" manufactured by Sakai Chemical Industry Co., Ltd., "Micron White" (Talc) manufactured by Hayashi Kasei Co., Ltd., "Benger" (bentonite) manufactured by Hayashi Kasei Co., Ltd., "BMM" and "BMT" (boehmite) manufactured by Kawaii Lime Industry Co., Ltd., "Serasur BMT-B" [alumina ($Al_2O_3$)] manufactured by Kawaii Lime Industry Co., Ltd., "Serath" (alumina) manufactured by Kinsei Matec Co., Ltd., "AKP series" (alumina) manufactured by Sumitomo Chemical Co., Ltd., and "Hikawa Mica Z-20" (sericite) manufactured by Hikawa Mining Co., Ltd. In addition, $SiO_2$, $Al_2O_3$, and ZrO can be produced by the method disclosed in Japanese Patent Laid-Open No. 2003-206475.

The average particle diameter of the inorganic particles is preferably in the range of 0.005 to 10 μm, more preferably 0.1 to 5 µm, particularly preferably 0.3 to 2 µm. When the average particle size of the inorganic particles is in the above range, the dispersion state of the porous film slurry is easily controlled, so that it is easy to manufacture a porous film having a uniform and uniform thickness. In addition, such average particle size provides the following advantages. The adhesion to the binder is improved, and even when the porous film is wound, it is possible to prevent the inorganic particles from peeling off, and as a result, sufficient safety can be achieved even if the porous film is thinned. Since it is possible to suppress an increase in the particle packing ratio in the porous film, it is possible to suppress a decrease in ion conductivity in the porous film. Furthermore, the porous membrane can be made thin.

The average particle size of the inorganic particles can be obtained by arbitrarily selecting 50 primary particles from an SEM (scanning electron microscope) image in an arbitrary field of view, carrying out image analysis, and obtaining the average value of circle equivalent diameters of each particle.

The particle diameter distribution (CV value) of the inorganic particles is preferably 0.5 to 40%, more preferably 0.5 to 30%, particularly preferably 0.5 to 20%. By setting the particle size distribution of the inorganic particles within the above range, a predetermined gap between the inorganic particles is maintained, so that it is possible to suppress an increase in resistance due to the inhibition of movement of lithium. The particle size distribution (CV value) of the inorganic particles can be determined by observing the inorganic particles with an electron microscope, measuring the particle diameter of 200 or more particles, determining the average particle diameter and the standard deviation of the particle diameter, and calculating (Standard deviation of particle diameter)/(average particle diameter). The larger the CV value means the larger variation in particle diameter.

When the solvent contained in the slurry for insulating layer is a non-aqueous solvent, a polymer dispersed or dissolved in a non-aqueous solvent can be used as a binder. As the polymer dispersed or dissolved in the non-aqueous solvent, polyvinylidene fluoride (PVdF), polytetrafluoroethylene (PTFE), polyhexafluoropropylene (PHFP), polytrifluoroethylene chloride (PCTFE), polyperfluoroalkoxyfluoroethylene, polyimide, polyamideimide, and the like can be used as a binder, and it is not limited thereto.

In addition, a binder used for binding the active material layer can also be used.

When the solvent contained in the slurry for insulating layer is an aqueous solvent (a solution using water or a mixed solvent containing water as a main component as a dispersion medium of the binder), a polymer dispersed or dissolved in an aqueous solvent can be used as a binder. A polymer dispersed or dissolved in an aqueous solvent includes, for example, an acrylic resin. As the acrylic resin, it is preferably to use homopolymers obtained by polymerizing monomers such as acrylic acid, methacrylic acid, acrylamide, methacrylamide, 2-hydroxyethyl acrylate, 2-hydroxyethyl methacrylate, methyl methacrylate, ethylhexyl acrylate, butyl acrylate. The acrylic resin may be a copolymer obtained by polymerizing two or more of the above monomers. Further, two or more of the homopolymer and the copolymer may be mixed. In addition to the above-mentioned acrylic resin, polyolefin resins such as styrene butadiene rubber (SBR) and polyethylene (PE), polytetrafluoroethylene (PTFE), and the like can be used. These polymers can be used singly or in combination of two or more kinds. Among them, it is preferable to use an acrylic resin. The form of the binder is not particularly limited, and particles in the form of particles (powder) may be used as they are, or those prepared in a solution state or an emulsion state may be used. Two or more kinds of binders may be used in different forms.

The insulating layer may contain a material other than the above-described inorganic filler and binder, if necessary. Examples of such material include various polymer materials that can function as a thickener for a slurry for the insulating layer, which will be described later. In particular, when an aqueous solvent is used, it is preferable to contain a polymer functioning as the thickener. As the polymer functioning as the thickener, carboxymethyl cellulose (CMC) or methyl cellulose (MC) is preferably used.

Although not particularly limited, the ratio of the inorganic filler to the entire insulating layer is suitably about 70 mass % or more (for example, 70 mass % to 99 mass %), preferably 80 mass % or more (for example, 80 mass % to 99 mass %), and particularly preferably about 90 mass % to 95 mass %.

The ratio of the binder in the insulating layer is suitably about 1 to 30 mass % or less, preferably 5 to 20 mass % or less. In the case of containing an insulating layer-forming component other than the inorganic filler and the binder, for example, a thickener, the content ratio of the thickener is preferably about 10 mass % or less, more preferably about 7 mass % or less. If the ratio of the binder is too small, strength (shape retentivity) of the insulating layer itself and adhesion to the active material layer are lowered, which may cause defects such as cracking and peeling. If the ratio of the binder is too large, gaps between the particles of the insulating layer become insufficient, and the ion permeability in the insulating layer may decrease in some cases.

In order to maintain ion conductivity, the porosity (void ratio) (the ratio of the pore volume to the apparent volume) of the insulating layer is preferably 20% or more, more preferably 30% or more. However, if the porosity is too high, falling off or cracking of the insulating layer due to friction or impact applied to the insulating layer occurs, the porosity is preferably 80% or less, more preferably 70% or less.

The porosity can be calculated from the ratio of the materials constituting the insulating layer, the true specific gravity and the coating thickness.

(Forming of Insulating Layer)

A method of forming the insulating layer will be described. As a material for forming the insulating layer, a paste type material (including slurry form or ink form, the same applies below) mixed and dispersed with an inorganic filler, a binder and a solvent can be used.

A solvent used for the insulating layer slurry includes water or a mixed solvent mainly containing water. As a solvent other than water constituting such a mixed solvent, one or more kinds of organic solvents (lower alcohols, lower ketones, etc.) which can be uniformly mixed with water can be appropriately selected and used. Alternatively, it may be an organic solvent such as N-methylpyrrolidone (NMP), pyrrolidone, methyl ethyl ketone, methyl isobutyl ketone, cyclohexanone, toluene, dimethylformamide, dimethylacetamide, or a combination of two or more thereof. The content of the solvent in the slurry for the insulating layer is not particularly limited, and it is preferably 40 to 90 mass %, particularly preferably about 50 to 70 mass %, of the entire coating material.

The operation of mixing the inorganic filler and the binder with the solvent can be carried out by using a suitable kneading machine such as a ball mill, a homodisper, Disper Mill (registered trademark), Clearmix (registered trademark), Filmix (registered trademark), an ultrasonic dispersing machine.

For the operation of applying the slurry for the insulating layer, conventional general coating means can be used without restricting. For example, a predetermined amount of the slurry for the insulating layer can be applied by coating in a uniform thickness by means of a suitable coating device (a gravure coater, a slit coater, a die coater, a comma coater, a dip coater, etc.).

Thereafter, the solvent in the slurry for the insulating layer may be removed by drying the coating material by means of a suitable drying means.

(Thickness)

The thickness of the insulating layer is preferably 1 μm or more and 30 μm or less, and more preferably 2 μm or more and 15 μm or less.

<Electrolyte>

As described above, the electrolyte used in the present embodiment includes an electrolyte component, which includes a support salt and a solvent that dissolves the support salt, and a crosslinked gelling agent. The crosslinked gelling agent absorbs the electrolyte component, whereby the electrolyte is gelled.

Lithium salts usable in commonly used lithium ion batteries, such as $LiPF_6$, $LiAsF_6$, $LiAlCl_4$, $LiClO_4$, $LiBF_4$, $LiSbF_6$, $LiCF_3SO_3$, $LiC_4F_9SO_3$, $LiC(CF_3SO_2)_3$, and $LiN(CF_3SO_2)_2$, can be used as supporting electrolytes. One supporting electrolyte can be used singly, or two or more can be used in combination.

As the solvent, a non-aqueous solvent can be preferably used. As the non-aqueous solvent, aprotic organic solvents such as carbonic acid esters (chain or cyclic carbonates), carboxylic acid esters (chain or cyclic carboxylic acid esters), and phosphoric acid esters can be used.

Examples of the carbonic acid ester solvents include cyclic carbonates such as propylene carbonate (PC), ethylene carbonate (EC), butylene carbonate (BC), and vinylene carbonate (VC); chain carbonates such as dimethyl carbonate (DMC), diethyl carbonate (DEC), ethyl methyl carbonate (EMC), and clipropyl carbonate (DPC); and propylene carbonate derivatives.

Examples of the carboxylic acid ester solvents include aliphatic carboxylic acid esters such as methyl formate, methyl acetate, and ethyl propionate; and lactones such as γ-butyrolactone.

Among these, carbonic acid esters (cyclic or chain carbonates) such as ethylene carbonate (EC), propylene carbonate (PC), butylene carbonate (BC), vinylene carbonate (VC), dimethyl carbonate (DMC), diethyl carbonate (DEC), ethyl methyl carbonate (MEC), and clipropyl carbonate (DPC) are preferable.

Examples of the phosphoric acid esters include trimethyl phosphate, triethyl phosphate, tripropyl phosphate, trioctyl phosphate, and triphenyl phosphate.

Also, other examples of solvents that can be contained in the non-aqueous electrolytic solution include ethylene sulfite (ES), propane sultone (PS), butane sultone (BS), clioxathiolane-2,2-dioxide (DD), sulfolene, 3-methylsulfolene, sulfolane (SL), succinic anhydride (SUCAH), propionic anhydride, acetic anhydride, maleic anhydride, diallyl carbonate (DAC), dimethyl 2,5-clioxahexaneclioate, dimethyl 2,5-clioxahexaneclioate, furan, 2,5-dimethylfuran, diphenyl disulfide (DPS), dimethoxyethane (DME), dimethoxymethane (DMM), diethoxyethane (DEE), ethoxymethoxyethane, chloroethylene carbonate, dimethyl ether, methyl ethyl ether, methyl propyl ether, ethyl propyl ether, dipropyl ether, methyl butyl ether, diethyl ether, phenyl methyl ether, tetrahydrofuran (THF), 2-methyltetrahydrofuran (2-MeTHF), tetrahydropyran (THP), 1,4-dioxane (DIOX), 1,3-dioxolane (DOL), methyl acetate, ethyl acetate, propyl acetate, isopropyl acetate, butyl acetate, methyl difluoroacetate, methyl propionate, ethyl propionate, propyl propionate, methyl formate, ethyl formate, ethyl butyrate, isopropyl butyrate, methyl isobutyrate, methyl cyanoacetate, vinyl acetate, diphenyl disulfide, dimethyl sulfide, diethyl sulfide, acliponitrile, valeronitrile, glutaronitrile, malononitrile, succinonitrile, pimelonitrile, suberonitrile, isobutyronitrile, biphenyl, thiophene, methyl ethyl ketone, fluorobenzene, hexafluorobenzene, carbonate electrolytic solutions, glyme, ether, acetonitrile, propionitrile, ybutyrolactone, yvalerolactone, dimethylsulfoxide (DMSO) ionic liquids, phosphazene, aliphatic carboxylic acid esters such as methyl formate, methyl acetate, and ethyl propionate, and those obtained by replacing some hydrogen atoms of these compounds with fluorine atoms.

The electrolyte is gelled in the region where the crosslinked gelling agent exists by crosslinking of the gelling agent. The gelling agent can include, for example, an acrylic resin, a fluoroethylene resin, etc. alone or in combination. Further, the gelling agent preferably contains an acrylic resin ester having a crosslinkable functional group.

Examples of the gelling agent include monomers, oligomers, or copolymerized oligomers having two or more thermally polymerizable polymerizing groups per molecule. Specific examples include di-functional acrylates such as ethylene glycol diacrylate, diethylene glycol diacrylate, triethylene glycol diacrylate, tetraethylene glycol diacrylate, propylene diacrylate, dipropylene diacrylate, tripropylene diacrylate, 1,3-butanecliol diacrylate, 1,4-butanediol diacrylate, and 1,6-hexanediol diacrylate, tri-functional acrylates such as trimethylolpropane triacrylate and pentaerythritol triacrylate, tetra-functional acrylates such as ditrimethylolpropane tetraacrylate and pentaerythritol tetraacrylate, and methacrylate analogous monomers of these that form acrylic polymers. Examples other than these include monomers such as urethane acrylate and urethane methacrylate, copolymerized oligomers thereof, and copolymerized oligomers with acrylonitrile. Also, polymers that can dissolve and gel in plasticizers such as polyvinylidene fluoride, polyethylene oxide, and polyacrylonitrile can be used as well.

The gelling agent is not limited to the above monomers, oligomers, or polymers, and any gelling agent can be used as long as it is crosslinkable. Also, the gelling agent is not limited to one monomer, oligomer, or polymer, and two to several gelling agents can be used as a mixture as necessary. Moreover, benzoins, peroxides, and the like can also be used as thermal polymerization initiators as necessary. However, thermal polymerization initiators are not limited to these.

Also, a methacrylic acid ester polymer represented by general formula (1) below can be contained as the gelling agent. Due to the crosslinking of this methacrylic acid ester polymer, the electrolyte gels.

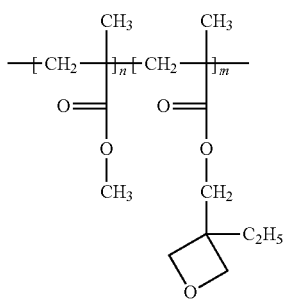 (1)

In general formula (1), n satisfies 1800<n<3000, and m satisfies 350<m<600.

The methacrylic acid ester polymer represented by general formula (1) is obtained by radically copolymerizing methyl methacrylate and (3-ethyl-3-oxetanyl) methyl methacrylate. n indicating the number of methyl methacrylate units satisfies 1800<n<3000, and m indicating the number of (3-ethyl-3-oxetanyl) methyl methacrylate units satisfies 350<m<600. Note that the methacrylic acid ester polymer represented by general formula (1) may be a block copolymer and may be a random copolymer. Also, n and m indicate average values and are not integers in some cases.

A crosslinked product obtained by crosslinking the methacrylic acid ester polymer represented by general formula (1) (hereinafter simply referred to as a "crosslinked product") is obtained by subjecting the oxetanyl group of the methacrylic acid ester polymer represented by general formula (1) to ring-opening polymerization using a cationic polymerization initiator. Although a generally known polymerization initiator can be used as a cationic polymerization initiator, it is preferable to utilize a lithium salt contained in the electrolytic solution and a small amount of an acidic substance resulting from the hydrolysis of the anionic component of the lithium salt because properties imparted to the battery are minor. Here, the content of the lithium salt in the electrolytic solution is identical to a preferable concentration of a supporting electrolyte in the electrolytic solution.

The electrolyte containing the gelled region is conveniently and stably produced by, for example, a method having the step of dissolving a supporting electrolyte in an aprotic solvent, the step of mixing the aprotic solvent with a methacrylic acid ester polymer represented by general formula (1) as a gelling agent, and the step of crosslinking the methacrylic acid ester polymer represented by general formula (1).

In the production of electrolytes, the amount of the gelling agent added to 100% by mass of the electrolyte component may be considered to be equal to the proportion of the crosslinked gelling agent to 100% by mass of the electrolyte component in the finally obtained electrolyte. That is, in the present embodiment, the addition amount of the gelling agent in the production of the electrolyte is 0.2 to 5% by mass with respect to 100% by mass of the electrolyte component. In order to further improve the bubble retaining effect, the addition amount of the gelling agent is more preferably 0.5% by mass or more, still more preferably 1.0% by mass or more. Further, in order to further improve the ion conductivity, the addition amount of the gelling agent is preferably 3% by mass or less, more preferably 2% by mass or less.

<Casing>

A casing that is stable in the electrolytie and has sufficient water-vapor barrier properties can be suitably selected. For example, in the case of a layered laminate secondary battery, a laminate film of aluminum and resin is preferably used as a casing. The casing may be composed of a single member and may be composed of a combination of a plurality of members.

The casing can be provided with a safety valve so as to open when an abnormality occurs to allow the electrolyte inside to be discharged to the outside of the secondary battery. With the casing provided with a safety valve, bubbles are generated between the electrodes due to abnormal heat generation of the secondary battery, and the electrolyte expelled from between the electrodes by the generated bubbles is discharged to the outside of the secondary battery through the safety valve together with the volatile component.

As a safety valve, a known safety valve used as a safety valve for this kind of secondary batteries, such as any safety valve of a pressure detecting type or a temperature detecting type, can be used. The pressure detecting type is a mechanism represented by a burst valve, and is not particularly limited as long as it operates according to the internal pressure increased by the volatilized electrolyte. The temperature detecting type is represented by a mechanism in which the laminate exterior or a joined sealed part thereof thermally melts to thereby release the volatile component inside to the outside of the battery, but is not necessarily limited thereto.

The battery element of the present invention is not limited to the battery element of the lithium ion secondary battery above, and the present invention is applicable to any batteries. However, heat dissipation problems are in many cases problematic in high-capacity batteries, and the present invention is thus preferably applied to high-capacity batteries and, in particular, lithium ion secondary batteries.

[5] Separator

When the battery element 10 has a separator between the positive electrode 11 and the negative electrode 12, the separator is not particularly limited, and a porous film or a nonwoven fabric made of polypropylene, polyethylene, fluororesin, polyamide, polyimide, polyester, polyphenylene sulfide or the like can be used as the separator. In addition, those including inorganic materials such as silica, alumina, glass and the like adhered or joined to the porous firm or the nonwoven fabric used as a base material and the inorganic materials alone processed into a nonwoven fabric or a cloth can also be used as the separator. Furthermore, a laminate of the theses can be used as the separator.

The present invention is not limited to the above described lithium ion secondary battery and can be applied to any battery. However, since the problem of heat often occurs in batteries with high capacity in many cases, the present invention is preferably applied to batteries with high capacity, particularly lithium ion secondary batteries.

Next, embodiments of method for manufacturing the electrode shown in FIG. 3 will be described. In the following description, the positive electrode 11 and the negative electrode 12 will be described as "electrodes" without particularly distinguishing from each other, but the positive electrode 11 and the negative electrode differ only in the materials, shapes, etc. to be used, and the following explanation will be made on the positive electrode 11 and the negative electrode 12.

The manufacturing method of the electrode is not particularly limited as long as the electrode has a structure in which the active material layer 111 and the insulating layer 112 are laminated in this order on the current collector 110 finally.

The active material layer 111 can be formed by applying an mixture for an active material layer prepared by dispersing an active material and a binder in a solvent to form a slurry and drying the applied mixture for the active material layer. After the mixture for the active material layer is dried, the method may further include the step of compression-molding the dried mixture for the active material layer. The insulating layer 12 can also be formed in the same process as the active material layer 111. That is, the insulating layer 112 can be formed by applying an mixture for an insulating layer prepared by dispersing an insulating material and a binder in a solvent to form a slurry, and drying the applied mixture for the insulating layer. After the mixture for the insulating layer is dried, the method may further include the step of compression molding the dried mixture for the insulating layer.

The process for forming the active material layer 111 and the process for forming the insulating layer 112 described above may be carried out separately or in appropriate combination. Combining the forming process of the active material layer 111 and the forming process of the insulating layer 112 includes for example the following procedure: before drying the mixture for the active material layer applied on the current collector 110, the mixture for the insulating layer is applied on the applied mixture for the active material layer, and the whole of the mixture for the active material layer and the mixture for the insulating layer are simultaneously dried; after application and drying of the mixture for the active material layer, application and drying of the mixture for the insulating layer are performed thereon, and the whole of the mixture for the active material layer and the mixture for the insulating layer are simultaneously compression molded. By combining the formation process of the active material layer 111 and the formation process of the insulating layer 112, the manufacturing process of the electrode can be simplified.

Although the present invention has been described with reference to one embodiment, the present invention is not limited to the above-described embodiments, and can be arbitrarily changed within the scope of the technical idea of the present invention.

For example, in the above embodiment, the case where the active material layer 111 and the insulating layer 112 are applied to one side of the current collector 110 has been described. However, it is possible to manufacture an electrode having the active material layer 111 and the insulating layer 112 on both surface of the current collector 110 by applying the active material layer 111 and the insulating layer 112 on the other side of the current collector 110 in a similar manner.

Further, the battery obtained by the present invention can be used in various uses. Some examples are described below.

[Battery Pack]

A plurality of batteries can be combined to form a battery pack. For example, the battery pack may have a configuration in which two or more batteries according to the present embodiment are connected in series and/or in parallel. The series number and parallel number of the batteries can be appropriately selected according to the intended voltage and capacity of the battery pack.

[Vehicle]

Figure 6:
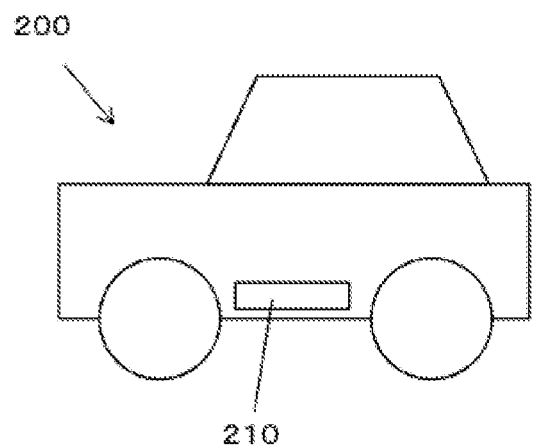
FIG. 6 is a schematic view showing an embodiment of an electric vehicle equipped with a battery.

The above-described battery or the battery pack thereof can be used for a vehicle. Examples of vehicles that can use batteries or assembled batteries include hybrid vehicles, fuel cell vehicles, and electric vehicles (four-wheel vehicles (commercial vehicles such as passenger cars, trucks and buses, and mini-vehicles, etc.), motorcycles (motorbike and tricycles). Note that the vehicle according to the present embodiment is not limited to an automobile, and the battery can also be used as various power sources for other vehicles, for example, transportations such as electric trains. As an example of such a vehicle, FIG. 6 shows a schematic diagram of an electric vehicle. The electric vehicle 200 shown in FIG. 6 has a battery pack 210 configured to satisfy the required voltage and capacity by connecting a plurality of the above-described batteries in series and in parallel.

[Power Storage Device]

Figure 7:
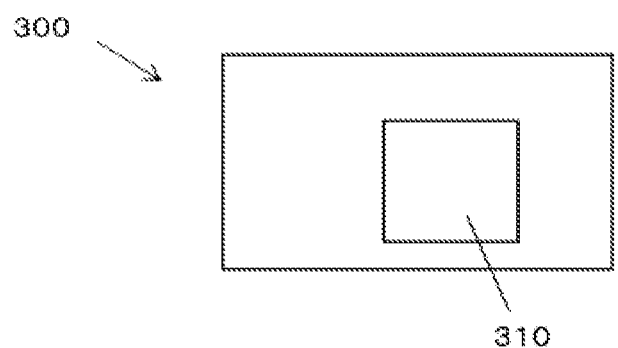
FIG. 7 is a schematic diagram showing an example of a power storage device equipped with a battery.

The above-described battery or the battery pack thereof can be used for a power storage device. Examples of the power storage device using the secondary battery or the battery pack thereof include a power storage device which is connected between a commercial power supply supplied to an ordinary household and a load such as a household electric appliance to use as a backup power source or an auxiliary power source in case of power outage, and a power storage device used for large-scale electric power storage for stabilizing electric power output with large time variation due to renewable energy such as photovoltaic power generation. An example of such a power storage device is schematically shown in FIG. 7. The power storage device 300 shown in FIG. 7 has a battery pack 310 configured to satisfy a required voltage and capacity by connecting a plurality of the above-described batteries in series and in parallel.

[Others]

Furthermore, the above-described battery or the battery pack thereof can be used as a power source of a mobile device such as a mobile phone, a notebook computer and the like.

EXAMPLES

The present invention will be described with reference to specific examples below.

Example 1

(Preparation of Insulating Layer Coated Positive Electrode)

$LiNi_{0.8}Mn_{0.15}Co_{0.05}$, a carbon conductive agent (acetylene black) and polyvinylidene fluoride (PVdF) as a binder were dispersed in N-methyl-2-pyrrolidone at a weight ratio of 90:5:5 to prepare a slurry for a positive electrode active material layer. This slurry was applied to the surface of a positive electrode current collector foil made of aluminum and dried to form a positive electrode active material layer. A positive electrode active material layer was similarly formed on the back surface of the positive electrode current collector foil.

Subsequently, alumina and polyvinylidene fluoride (PVdF) as a binder were dispersed in N-methyl-2-pyrrolidone at a weight ratio of 90:10 to prepare a slurry for an insulating layer. This was applied to the positive electrode active material layer and dried to form an insulating layer. An insulating layer was similarly formed on the positive electrode active material layer on the back side of the positive electrode current collector foil. Subsequently, the whole of the positive electrode current collector foil, the positive electrode active material layer and the insulating layer were compression-molded and further cut into a predetermined shape to prepare a plurality of positive electrodes (insulating layer coated positive electrodes).

(Preparation of Insulating Layer Coated Negative Electrode)

Natural graphite, sodium carboxymethyl methyl cellulose as a thickener and styrene butadiene rubber as a binder were mixed in an aqueous solution at a weight ratio of 97:1:2 to prepare a slurry for a negative electrode active material layer. This was applied to the surface of a negative electrode current collector foil made of copper and dried to form a negative electrode active material layer. A negative electrode active material layer was similarly formed on the back surface of the negative electrode current collector foil. Subsequently, the whole of negative electrode current collector foil and the negative electrode active material layer were compression-molded and then the whole of the negative electrode current collector foil and the negative electrode active material layer were compression molded.

Subsequently, alumina and polyvinylidene fluoride (PVdF) as a binder were dispersed in N-methyl-2-pyrrolidone at a weight ratio of 90:10 to prepare a slurry for an insulating layer. This was applied to the negative electrode active material layer and dried to form an insulating layer. An insulating layer was similarly formed on the negative electrode active material layer on the back side of the negative electrode current collector foil. Subsequently, the whole of the negative electrode current collector foil, the negative electrode active material layer and the insulating layer were compression molded and further cut into a predetermined shape to prepare a plurality of negative electrodes (insulating layer coated negative electrodes).

(Preparation of Pregel Solution)

A pregel solution to be a polymer gel electrolyte was prepared by the following process. An electrolyte component was obtained by adding 12% by mass of $LiPF_6$ as a supporting salt to a non-aqueous solvent consisting of 30% by mass of ethylene carbonate (EC) and 58% by mass of diethyl carbonate (DEC). To 100% by mass of the obtained electrolyte component, 1% by mass of a copolymer containing 74:26 (% by mass) of ethyl acrylate and (3-ethyl-3 oxetanyl) methyl methacrylate as a gelling agent was added.

(Preparation of Battery)

The plurality of positive electrodes and the plurality of negative electrodes obtained above were alternately laminated directly without using a separator to produce a battery element. The extended portion of each positive electrode was collected into one and welded, and the positive electrode terminal was connected to this portion. Similarly, the extended portion of each negative electrode was collected into one and welded, and the negative electrode terminal was connected to this portion. The battery element was obtained. The obtained battery was contained in a bag-like casing in a state that a part of the positive electrode terminal and a part of the negative electrode terminal were protruded from the casing. As the casing, a laminate film of aluminum and resin was used. The pregel solution was poured into the casing containing the battery element, then the casing was sealed under reduced pressure. Thereafter, the gelling agent was crosslinked by holding at 60° C. for 20 hours to gelate the pregel solution. As a result, a battery having a gelled electrolyte in the state of being impregnated in the battery element was prepared. The size of the battery element was adjusted so that the initial charge capacity of the battery was 100 mAh.

10 batteries were prepared by the above-described series of process, and the charge and discharge test and the 160° C. heating test described below were performed on the 10 batteries.

(Charge and Discharge Test)

In the charge and discharge test, first, charge was performed with a charge current of 20 mA, upper limit voltage of 4.15 V, by constant current constant voltage charge (CCCV) (total charge time is 6.5 hours), and then discharge was performed with a discharge current of 100 mA, lower limit voltage of 2.5V, by constant current discharge (CC). In charging, a battery having a charging capacity exceeding 110 mA, or a battery whose voltage decreased by 0.1 V or more despite the charging was considered to be a battery in which an internal short circuit occurred. Table 1 shows the number of batteries in which the internal short circuit has occurred. The average value of the discharge capacity is also shown in Table 1. Regarding the discharge capacity, the average value of 10 batteries including the batteries in which the internal short circuit occurred was calculated.

The battery in which the internal short circuit did not occur in the charge and discharge test was subjected to the 160° C. heating test after the battery was charged to 4.2 V. The heating rate was 10° C./min, and the temperature was maintained for 30 minutes after reaching 160° C.

Example 2

A battery was prepared in the same manner as Example 1 except that the added amount of the gelling agent is changed to 1.5% by mass, and the charge and discharge test and the 160° C. heating test were carried out in the same manner as Example 1.

Example 3

A battery was prepared in the same manner as Example 1 except that the added amount of the gelling agent is changed to 2% by mass, and the charge and discharge test and the 160° C. heating test were carried out in the same manner as Example 1.

Example 4

A battery was prepared in the same manner as Example 1 except that the added amount of the gelling agent is changed to 5% by mass, and the charge and discharge test and the 160° C. heating test were carried out in the same manner as Example 1.

Example 5

A battery was prepared in the same manner as Example 1 except that the added amount of the gelling agent is changed to 0.5% by mass, and the charge and discharge test and the 160° C. heating test were carried out in the same manner as Example 1.

Example 6

A battery was prepared in the same manner as Example 1 except that the added amount of the gelling agent is changed to 0.2% by mass, and the charge and discharge test and the 160° C. heating test were carried out in the same manner as Example 1.

Example 7

(Preparation of Insulating Layer Coated Positive Electrode)

A plurality of positive electrodes (insulation layer coated positive electrodes) were prepared in the same manner as in Example 1.

(Preparation of Insulating Layer Coated Negative Electrode)

A plurality of negative electrodes (insulation layer coated negative electrodes) were prepared in the same manner as in Example 1.

(Preparation of Polymer Solution)

A polymer solution was prepared by adding 2% by mass of polyvinylidene fluoride (matrix polymer) as a gelling agent to 100% by mass of a swelling solvent (non-aqueous electrolyte component) and mixing uniformly. The swelling solvent used was a solvent in which 12% by mass of $LiPF_6$ was dissolved as a supporting salt in a non-aqueous solvent in which 30% by mass of ethylene carbonate and 58% by mass of diethyl carbonate were mixed.

(Preparation of Polymer+Insulating Layer Coated Positive Electrode)

The polymer solution was applied onto both surfaces of the insulating layer coated positive electrode prepared above, and the applied polymer solution was dried to prepare an insulating layer coated positive electrode having a gel electrolyte layer. The polymer solution was applied so that the thickness of the gel electrolyte layer after drying was 10 μm. Next, the swelling solvent was dried under reduced pressure until the weight ratio of the swelling solvent to the matrix polymer was 8:1, whereby an insulating layer coated positive electrode having a gel electrolyte layer was obtained.

(Preparation of Electrolyte)

An electrolyte was prepared by adding 12% by mass of $LiPF_6$ as a support salt to a non-aqueous solvent consisting of 30% by mass of ethylene carbonate (EC) and 58% by mass of diethyl carbonate (DEC).

(Preparation of Battery)

The plurality of positive electrodes and the plurality of negative electrodes obtained above were alternately laminated directly without using a separator to prepare a battery element. The extended portion of each positive electrode was collected into one and welded, and the positive electrode terminal was connected to this portion. Similarly, the extended portion of each negative electrode was collected into one and welded, and the negative electrode terminal was connected to this portion. The battery element was obtained. The obtained battery was contained in a bag-like casing in a state that a part of the positive electrode terminal and a part of the negative electrode terminal were protruded from the casing. As the casing, a laminate film of aluminum and resin was used. The electrolyte was poured into the casing containing the battery element, then the casing was sealed under reduced pressure. The size of the battery element was adjusted so that the initial charge capacity of the battery was 100 mAh.

10 batteries were prepared by the above-described series of process, and the charge and discharge test and the 160° C. heating test were performed on the 10 batteries in the same manner as in Example 1.

Example 8

(Preparation of Insulating Layer Coated Positive Electrode)

A plurality of positive electrodes (insulation layer coated positive electrodes) were prepared in the same manner as in Example 1.

(Preparation of Insulating Layer Coated Negative Electrode)

A plurality of negative electrodes (insulation layer coated negative electrodes) were prepared in the same manner as in Example 1.

(Preparation of Polymer Solution)

A polymer solution was prepared in the same manner as in Example 7.

(Preparation of Polymer+Insulating Layer Coated Negative Electrode)

The polymer solution was applied onto both surfaces of the insulating layer coated negative electrode prepared above, and the applied polymer solution was dried to prepare an insulating layer coated negative electrode having a gel electrolyte layer. The polymer solution was applied so that the thickness of the gel electrolyte layer after drying was 10 μm. Next, the swelling solvent was dried under reduced pressure until the weight ratio of the swelling solvent to the matrix polymer was 8:1, whereby an insulating layer coated negative electrode having a gel electrolyte layer was obtained.

(Preparation of Electrolyte)

A polymer solution was prepared in the same manner as in Example 7.

(Preparation of Battery)

The plurality of positive electrodes and the plurality of negative electrodes obtained above were alternately laminated directly without using a separator to prepare a battery element. The subsequent steps were the same as in Example 7, and 10 batteries were prepared. The size of the battery element was adjusted so that the initial charge capacity of the battery was 100 mAh.

The charge and discharge test and the 160° C. heating test were performed on the prepared 10 batteries in the same manner as in Example 1.

Comparative Example 1

(Preparation of Insulating Layer Coated Positive Electrode)

A plurality of positive electrodes (insulation layer coated positive electrodes) were prepared in the same manner as in Example 1.

(Preparation of Insulating Layer Coated Negative Electrode)

A plurality of negative electrodes (insulation layer coated negative electrodes) were prepared in the same manner as in Example 1.

(Preparation of Electrolyte)

A electrolyte was prepared in the same manner as in Example 7.

(Preparation of Battery)

The plurality of positive electrodes and the plurality of negative electrodes obtained above were alternately laminated directly without using a separator to prepare a battery element. The subsequent steps were the same as in Example 7, and 10 batteries were produced. The size of the battery element was adjusted so that the initial charge capacity of the battery was 100 mAh.

The charge and discharge test and the 160° C. heating test were performed on the prepared 10 batteries in the same manner as in Example 1.

Comparative Example 2

In Comparative Example 1, a plurality of positive electrodes and a plurality of negative electrodes were alternately laminated by arranging polypropylene (PP) separators therebetween to prepare a battery element. The subsequent steps were the same as in Example 7, and 10 batteries were produced. The charge and discharge test and the 160° C. heating test were performed on the prepared 10 batteries in the same manner as in Example 1.

Comparative Example 3

A plurality of positive electrodes and a plurality of negative electrodes were produced in the same manner as in Example 1 except that the insulating layer was not formed in the preparation of the plurality of positive electrodes and the plurality of negative electrodes.

The subsequent steps were the same as in Comparative Example 2, and 10 batteries were produced. The charge and discharge test and the 160° C. heating test were performed on the prepared 10 batteries in the same manner as in Example 1.

For Examples 1 to 8 and Comparative Examples 1 to 3, the main configurations, the results of the charge and discharge test and the results of the 160° C. heating test are shown in Table 1.

releasing the gas (degassing) existing in the casing out of the casing by partially opening the casing of the battery after charging and placing the battery under reduced pressure environment.

In addition, the batteries not using the separators shown in Examples 1 to 8 have higher safety results in the 160° C. heating test as compared with the batteries using the PP separators shown in Comparative Examples 2 and 3.

This is an effect of securing insulation between the positive and negative electrodes with insulating layer having high heat resistance instead of using separators weak to heat. As shown in Comparative Example 2, even in the battery in which the positive and negative electrodes were coated with the insulating layer, smoke was generated in the 160° C. heating test. It is considered that the reason is that the separator was shrunk by heating, and the insulating layer in close contact with the separator was pulled by the separator and peeled off from the active material layer.

Figure 8:
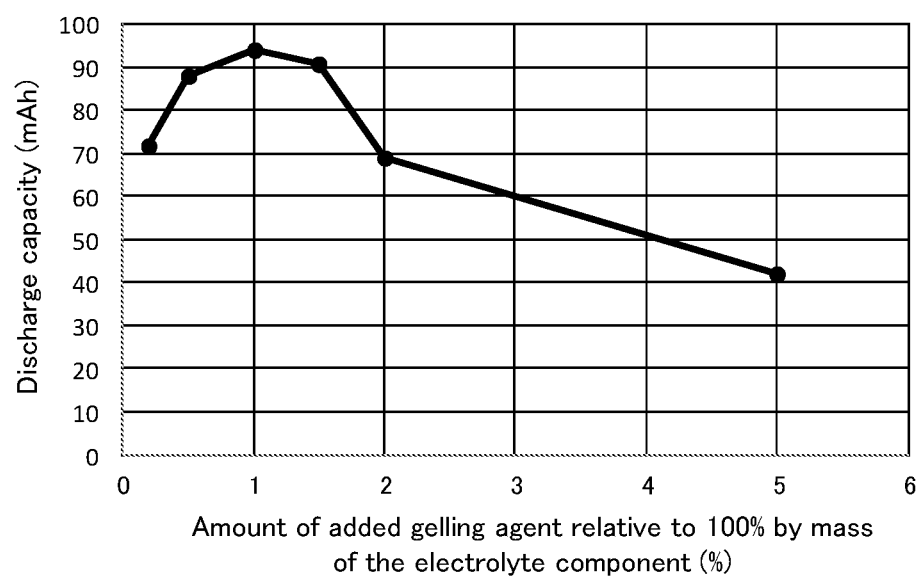
FIG. 8 is a graph showing the relationship between the gelling agent addition amount and the initial discharge capacity in Examples 1 to 6.

FIG. 8 shows a graph of the relationship between the addition amount of the gelling agent and the initial discharge capacity with respect to 100% by mass of the electrolyte component in Examples 1 to 6. As clearly shown in FIG. 8, when the addition amount of the gelling agent in the gel electrolyte was increased to 1.5% or more, the initial discharge capacity decreased. It is considered that this is because the resistance increased due to the gelling agent. Therefore, from the viewpoint of the initial discharge capacity, the addition amount of the gelling agent is preferably 2% or less, and more preferably 1.5% or less. In addition, it was found that when the addition amount is 0.5% or less, the

TABLE 1

| | Thickness of Insulating Layer (μm) | | | Electrolyte Addition Amount of Gelling Agent (%) | Rate of Occurrence of Internal Short Circuit during First Charge | First Discharge Capacity (mAh) | 160° C. Heating Test |
|---|---|---|---|---|---|---|---|
| | Positive Electrode | Negative Electrode | Separator | | | | |
| Example 1 | 8 | 12 | No | 1 | 0/10 | 91 | No smoke and ignite |
| Example 2 | 8 | 12 | No | 1.5 | 0/10 | 91 | No smoke and ignite |
| Example 3 | 8 | 12 | No | 2 | 0/10 | 69 | No smoke and ignite |
| Example 4 | 8 | 12 | No | 3 | 0/10 | 12 | No smoke and ignite |
| Example 5 | 8 | 12 | No | 0.5 | 2/10 | 69 | No smoke and ignite |
| Example 6 | 8 | 12 | No | 0.5 | 1/10 | 72 | No smoke and ignite |
| Example 7 | 8 *10 (*1) | 12 | No | 2 (*2) | 5/10 | 70 | No smoke and ignite |
| Example 8 | 8 | 12 *10 (*1) | No | 2 (*2) | 5/10 | 70 | No smoke and ignite |
| Comparative Example 1 | 8 | 12 | No | 0 | 10/10 | 63 | No smoke and ignite |
| Comparative Example 2 | 8 | 12 | PP | 0 | 0/10 | 93 | smoke |
| Comparative Example 3 | No | No | PP | 0 | 0/10 | 91 | smoke |

(*1) The added value is the thickness of the elctrolyte layer after drying. In Examples 7 and 8, since the electrolyte layer formed on the active material layer may be considered to be configured as a part of the electrode, such an expression is used.
(*2) It is the addition amount in the electrolyte applied on the active material.

As shown in Table 1, It was confirmed that the batteries having the gel electrolyte shown in Examples 1 to 8 have an improved rate of occurrence of short circuit since the rate of occurrence of short circuit during the first charge was lowered as compared with the batteries having the electrolyte without the gelled region shown in Comparative Example 1. Examples 6 to 8 have a lower degree of improvement as compared with Examples 1 to 5. However, the rate of occurrence of internal short circuit can be improved to the same extent as in Examples 1-5, if other techniques are used in combination, for example, such as initial discharge capacity decreases, and furthermore, the possibility of internal short circuit during the first charge increases (from the comparison of Examples 4 to 6).

Accordingly, in view of the rate of occurrence of internal short circuit and the initial discharge capacity during the first charge, the addition amount of the gelling agent is preferably 0.2% or more, and more preferably 0.5% or more.

In terms of gel type, the rate of occurrence of internal short circuit during the first charge is lower for chemical gel, in comparison between physical gel, which is obtained by applying the polymer solution in which the gelling agent is added to the electrolyte component to the electrode and drying the polymer solution as in Examples 7 and 8, and chemical gel, which is obtained by impregnating the battery element with the pregel solution in which the gelling agent is added to the electrolyte component and then heating the battery element as in Examples 1 to 6.

From the above, the chemical gel is considered to be preferable also from the viewpoint of the rate of occurrence of internal short circuit during the firstl charge.

Further Exemplary Embodiments

The present invention has been described in detail above. The present specification discloses the inventions described in the following further exemplary embodiments. However, the disclosure of the present specification is not limited to the following further exemplary embodiments.

Further Exemplary Embodiment 1

A secondary battery comprising:
a battery element (10) including at least one positive electrode (11) and at least one negative electrode (12),
a casing (21, 22) which seals the battery element (10) together with an electrolyte,
wherein at least one of the positive electrode (11) and the negative electrode (12) comprises a current collector (110), an active material layer (111) formed on at least one surface of the current collector (110), and insulating layer (112) formed on a surface of the active material layer (111), and
the electrolyte includes an electrolyte component including a solvent and a support salt and a crosslinked gelling agent, the crosslinked gelling agent exists at least between the active material layer of the positive electrode and the active material layer of the negative electrode, and a ratio Rg of the gelling agent to 100% by mass of the electrolyte component in between the active material layer of the positive electrode (11) and the active material layer of the negative electrode (12) is 0<Rg≤5% by mass.

Further Exemplary Embodiment 2

The secondary battery according to Further exemplary embodiment 1, wherein the electrode is impregnated with the crosslinked gelling agent, and on one side of the current collector, a ratio of a thickness of a region in which the crosslinked gelling agent exists to a thickness of an entire layer formed on the current collector is greater than 0.

Further Exemplary Embodiment 3

The secondary battery according to Further exemplary embodiment 2, wherein the ratio is 100%.

Further Exemplary Embodiment 4

The secondary battery according to Further exemplary embodiment 1, wherein the gelling agent is a gelling agent that forms a chemical gel.

Further Exemplary Embodiment 5

The secondary battery according to Further exemplary embodiment 1, wherein the gelling agent is a gelling agent that forms a physical gel.

Further Exemplary Embodiment 6

A method for manufacturing a secondary battery, the method comprising:
preparing at least one positive electrode (11) and at least one negative (12) electrode, wherein at least one of the positive electrode (11) and the negative electrode (11) comprises a current collector (110), an active material layer (111) formed on at least one surface of the current collector, (110) and an insulating layer (112) formed on a surface of the active material layer (111),
preparing an electrolyte which includes an electrolyte component including a solvent and a supporting salt and a gelling agent, and a ratio Rg of the gelling agent to 100% by mass of the electrolyte component is 0<Rg≤5% by mass,
enclosing the battery element (10) in which the positive electrode (11) and the negative electrode (12) are alternately laminated and the electrolyte in a bag-like casing (21, 22), so that the electrolyte exists between at least the active material layer of the positive electrode (11) and the active material layer of the negative electrode (12),
sealing the casing (21, 22) containing the battery element (10) and the electrolyte, and
gelling the electrolyte before or after sealing the casing (21, 22).

Further Exemplary Embodiment 7

The method for manufacturing the secondary battery according to Further exemplary embodiment 6, wherein the gelling agent is a gelling agent that forms a chemical gel, and
gelling the electrolyte includes crosslinking the gelling agent after sealing the casing (21, 22).

Further Exemplary Embodiment 8

The method for manufacturing the secondary battery according to Further exemplary embodiment 7,
wherein crosslinking the gelling agent includes heat treating the electrolyte in a form of a solution.

Further Exemplary Embodiment 9

The method for manufacturing the secondary battery according to Further exemplary embodiment 7 or 8, wherein sealing the casing (21, 22) includes:
pouring the electrolyte into the casing (21, 22) containing the battery element (10), and
sealing the casing (21, 22) poured with the electrolyte.

Further Exemplary Embodiment 10

The method for manufacturing the secondary battery according to Further exemplary embodiment 6, wherein the gelling agent is a gelling agent that forms a physical gel, and
gelling the electrolyte before sealing the casing (21, 22).

Further Exemplary Embodiment 11

The method for manufacturing the secondary battery according to Further exemplary embodiment 10, wherein enclosing the battery element (10) and the electrolyte in the casing (21, 22) includes:
applying the electrolyte in a form of a solution on at least one of the insulating layer (112) of the positive electrode (11) and the negative electrode (12), and obtaining the battery element (10) by alternately laminating the positive electrode (11) and the negative electrode (12) after applying the electrolyte.

INDUSTRIAL APPLICABILITY

The secondary battery according to the present invention can be used for all industrial fields requiring power sources and industrial fields related to transportation, storage and supply of electrical energy. More specifically, the battery according to the present invention can be used for power sources for mobile devices such as cellular phone, notebook personal computer; power sources for electric vehicles including electric car, hybrid car, electric motorcycle, power assist bicycle, and transfer/transportation media of trains, satellites and submarines; backup power sources for UPS or the like; electric storage facilities for storing electric power generated by photovoltaic power generation, wind power generation or the like.

EXPLANATION OF SYMBOLS

10 Battery element
10a Positive electrode tab
10b Negative electrode tab
11 Positive electrode
12 Negative electrode
31 Positive electrode terminal
32 Negative electrode terminal
110 Current collector
110a Extended portion
111 Active material layer
112 Insulating layer

The invention claimed is:

1. A secondary battery comprising:
a battery element including at least one positive electrode and at least one negative electrode,
a casing which seals the battery element together with an electrolyte,
wherein the positive electrode and the negative electrode comprises a current collector and an active material layer formed on at least one surface of the current collector, respectively, and
wherein at least one of the positive electrode and the negative electrode comprises an insulating layer formed on a surface of the active material layer, and
the electrolyte includes an electrolyte component including a solvent and a support salt and a crosslinked gelling agent, the crosslinked gelling agent exists at least between the active material layer of the positive electrode and the active material layer of the negative electrode, and a ratio Rg of the gelling agent to 100% by mass of the electrolyte component in between the active material layer of the positive electrode and the active material layer of the negative electrode is $1 \leq Rg \leq 2\%$ by mass, and
wherein the active material layer of the positive electrode comprises a lithium nickel composite oxide, and
wherein the lithium nickel composite oxide is represented by one or more of the following formula (i) to (iii):

$$Li_\alpha Ni_\beta Co_\gamma Mn_{67} O_2 \tag{i}$$

wherein in formula (i), $1 \leq \alpha \leq 1.2$, $\beta + \gamma + \delta = 1$, $\beta \geq 0.7$, and $\gamma \leq 0.2$;

wherein in formula (ii), $1 \leq \alpha \leq 1.2$, $\beta + \gamma + \delta = 1$, $\beta \geq 0.7$, and $\gamma \leq 0.2$;

$$LiNi_\beta Co_\gamma Mn_{67} O_2 \tag{iii}$$

wherein in formula (iii), $0.75 \leq \beta \leq 0.85$, $0.05 \leq \gamma \leq 0.15$, and $0.10 \leq \delta \leq 0.20$.

2. The secondary battery according to claim 1, wherein the positive electrode and the negative electrode are impregnated with the crosslinked gelling agent, and on one side of the current collector, a ratio of a thickness of a region in which the crosslinked gelling agent exists to a thickness of an entire layer formed on the current collector is greater than 0.

3. The secondary battery according to claim 2, wherein the ratio is 100%.

4. The secondary battery according to claim 1, wherein the gelling agent is a gelling agent that forms a chemical gel.

5. The secondary battery according to claim 1, wherein the gelling agent is a gelling agent that forms a physical gel.

6. A method for manufacturing a secondary battery, the method comprising:
preparing at least one positive electrode and at least one negative electrode, wherein the positive electrode and the negative electrode comprises a current collector, an active material layer formed on at least one surface of the current collector, respectively, and wherein at least one of the positive electrode and the negative electrode comprises an insulating layer formed on a surface of the active material layer,
preparing an electrolyte which includes an electrolyte component including a solvent and a supporting salt and a gelling agent, and a ratio Rg of the gelling agent to 100% by mass of the electrolyte component is $1 \leq Rg \leq 2\%$ by mass,
enclosing the battery element in which the positive electrode and the negative electrode are alternately laminated and the electrolyte in a bag-like casing, so that the electrolyte exists between at least the active material layer of the positive electrode and the active material layer of the negative electrode,
sealing the casing containing the battery element and the electrolyte, and
gelling the electrolyte before or after sealing the casing, and
wherein the active material layer of the positive electrode comprises a lithium nickel composite oxide, and
wherein the lithium nickel composite oxide is represented by one or more of the following formula (i) to (iii):

$$Li_\alpha Ni_\beta Co_\gamma Mn_{67} O2 \tag{i}$$

wherein in formula (i), $1 \leq \alpha \leq 1.2$, $\beta + \gamma + \delta = 1$, $\beta \geq 0.7$, and $\gamma \leq 0.2$;

$$Li_\alpha Ni_\beta Co_\gamma Al_{67} O2 \tag{ii}$$

wherein in formula (ii), $1 \leq \alpha \leq 1.2$, $\beta + \gamma + \delta = 1$, $\beta \geq 0.7$, and $\gamma \leq 0.2$;

$$LiNi_\beta Co_\gamma Mn_{67} O2 \tag{iii}$$

wherein in formula (iii), $0.75 \leq \beta \leq 0.85$, $0.05 \leq \gamma \leq 0.15$, and $0.10 \leq \delta \leq 0.20$.

7. The method for manufacturing the secondary battery according to claim 6, wherein the gelling agent is a gelling agent that forms a chemical gel, and gelling the electrolyte includes crosslinking the gelling agent after sealing the casing.

8. The method for manufacturing the secondary battery according to claim 7,
wherein crosslinking the gelling agent includes heat treating the electrolyte in a form of a solution.

9. The method for manufacturing the secondary battery according to claim 7, wherein sealing the casing includes:
pouring the electrolyte into the casing containing the battery element, and sealing the casing poured with the electrolyte.

10. The method for manufacturing the secondary battery according to claim 6, wherein the gelling agent is a gelling agent that forms a physical gel, and
gelling the electrolyte before sealing the casing.

11. The method for manufacturing the secondary battery according to claim 10, wherein enclosing the battery element and the electrolyte in the casing includes:
applying the electrolyte in a form of a solution on at least one of the insulating layer of the positive electrode and the negative electrode, and
obtaining the battery element by alternately laminating the positive electrode and the negative electrode after applying the electrolyte.

12. The secondary battery according to claim 1, wherein a thickness of the insulating layer is 1 μm or more and 30 μm or less.

13. The secondary battery according to claim 1, wherein a thickness of the insulating layer is 2 μm or more and 15 μm or less.

14. The method for manufacturing the secondary battery according to claim 6, wherein a thickness of the insulating layer is 1 μm or more and 30 μm or less.

15. The method for manufacturing the secondary battery according to claim 14, wherein a thickness of the insulating layer is 2 μm or more and 15 μm or less.

* * * * *